(12) United States Patent
Zhou

(10) Patent No.: US 11,950,104 B2
(45) Date of Patent: Apr. 2, 2024

(54) METHOD AND DEVICE FOR ADJUSTING AUTOMATIC RETRANSMISSION, BASE STATION, AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 426 days.

(21) Appl. No.: 17/292,419

(22) PCT Filed: Nov. 9, 2018

(86) PCT No.: PCT/CN2018/114778
§ 371 (c)(1),
(2) Date: May 7, 2021

(87) PCT Pub. No.: WO2020/093360
PCT Pub. Date: May 14, 2020

(65) Prior Publication Data
US 2022/0014930 A1 Jan. 13, 2022

(51) Int. Cl.
*H04W 16/14* (2009.01)
*H04W 72/0453* (2023.01)
(Continued)

(52) U.S. Cl.
CPC ....... *H04W 16/14* (2013.01); *H04W 72/0453* (2013.01); *H04W 72/1268* (2013.01); *H04W 74/0816* (2013.01)

(58) Field of Classification Search
CPC ............. H04W 16/14; H04W 72/0453; H04W 72/1268; H04W 74/0816; H04W 74/0808;
(Continued)

(56) References Cited

U.S. PATENT DOCUMENTS

2017/0215172 A1 7/2017 Yang et al.
2018/0035459 A1 2/2018 Islam et al.
(Continued)

FOREIGN PATENT DOCUMENTS

CN 101489267 A 7/2009
CN 105681002 A 6/2016
(Continued)

OTHER PUBLICATIONS

First Office Action of the Indian Application No. 202147024854, dated Feb. 25, 2022, (5p).
Intel Corporation, "Autonomous UL Transmission for NR Unlicensed Spectrum", 3GPP TSG-RAN WG2 Meeting #102 R2-1807369, Busan, Korea, May 21-25, 2018, (3p).
(Continued)

*Primary Examiner* — Jung H Park
(74) *Attorney, Agent, or Firm* — Arch & Lake LLP

(57) ABSTRACT

Provided are a method and apparatus for adjusting automatic retransmission. The method includes detecting uplink retransmission service information of at least two target user equipments (UEs), where after listen before talk (LBT) detection performed on a grant-free uplink transmission resource in an unlicensed spectrum fails, the at least two target UEs are capable of sharing a same original retransmission alternative resource to perform automatic uplink retransmission; determining whether the original retransmission alternative resource is overloaded according to the uplink retransmission service information; adjusting related configuration information of retransmission alternative resource to obtain adjusted retransmission configuration information in response to determining that the original retransmission alternative resource is overloaded; and delivering the adjusted retransmission configuration information to the at least two target UEs.

17 Claims, 27 Drawing Sheets

(51) Int. Cl.
*H04W 72/1268* (2023.01)
*H04W 74/0816* (2024.01)

(58) Field of Classification Search
CPC .... H04W 72/52; H04W 72/23; H04L 5/0023; H04L 5/006; H04L 1/1896; H04L 5/0032; H04L 5/0046; H04L 5/0091; H04L 1/1825; H04L 1/1806; H04L 5/0053
See application file for complete search history.

(56) References Cited

U.S. PATENT DOCUMENTS

| | | | |
|---|---|---|---|
| 2018/0295651 A1 | 10/2018 | Cao et al. | |
| 2019/0075584 A1* | 3/2019 | Li | H04L 5/0033 |
| 2019/0327045 A1* | 10/2019 | Zhang | H04W 72/0446 |
| 2020/0245376 A1 | 7/2020 | Cao et al. | |
| 2020/0389916 A1* | 12/2020 | Salem | H04W 74/006 |
| 2021/0298075 A1* | 9/2021 | Talarico | H04W 74/0808 |

FOREIGN PATENT DOCUMENTS

| | | |
|---|---|---|
| CN | 106993334 A | 7/2017 |
| CN | 107135051 A | 9/2017 |
| CN | 108347309 A | 7/2018 |
| WO | 2014005632 A1 | 1/2014 |

OTHER PUBLICATIONS

LG Electronics Inc, "Autonomous uplink transmission for NR-U", 3GPP TSG-RAN WG2 Meeting #103 R2-1812765 Gothenburg, Sweden, Aug. 20-24, 2018, (3p).
First Office Action of the Chinese Application No. 201880002570.0, dated Sep. 2, 2021 with English translation, (12p).
Supplementary European Search Report in the European Application No. 18939369.7, dated Nov. 5, 2021, (8p).
English translation of the Written Opinion of the International Search Authority in the international application No. PCT/CN2018/114778, dated May 30, 2019, (4p).
International Search Report of PCT Application No. PCT/CN2018/114778 dated May 30, 2019 with English translation, (4p).

\* cited by examiner

METHOD AND DEVICE FOR ADJUSTING AUTOMATIC RETRANSMISSION, BASE STATION, AND USER EQUIPMENT

CROSS-REFERENCE TO RELATED APPLICATION

This application is the U.S. national phase of International Application No. PCT/CN2018/114778, filed on Nov. 9, 2018, the disclosure of which is hereby incorporated by reference in its entirety for all purposes.

TECHNICAL FIELD

The present disclosure relates to the field of communication technologies, and more particularly, to a method and apparatus for adjusting automatic retransmission, a base station, and a user equipment (UE).

BACKGROUND

A 5G New Radio (NR) system opens up many new frequency resources for information transmission, and the use of a high frequency spectrum is a feature of the 5G NR. Another feature of the new frequency spectrum opened up by the 5G NR is that a large amount of resources in the unlicensed spectrum such as 2.4 GHz and 5 GHz are used for transmission. Because a base station and a terminal need to operate with other systems such as WiFi when operating in the unlicensed spectrum, it is also necessary to follow the channel avoidance mechanism of the WiFi system, that is, the listen before talk (LBT) mechanism.

In the unlicensed spectrum, after the terminal successfully detects a transmission opportunity by using the LBT mechanism, the terminal occupies, according to Maximum Channel Occupation Time (MCOT) or a preset Channel Occupation Time (COT), a channel for a period of time for performing uplink data transmission under the authorization of the base station.

In the 5G NR system, a shared Grant-free/Autonomous UL (GUL/AUL) mechanism and an automatic retransmission mechanism are introduced for the utilization of resources in the unlicensed spectrum. In a shared GUL mechanism, a base station may configure multiple target UEs to share a periodic uplink transmission resource in a grant-free transmission period, that is, the shared uplink transmission resource. When there are transmission collisions among the above multiple target UEs, that is, the above multiple target UEs contend for the same shared uplink transmission resource, the UE that fails in contention, that is, fails in LBT detection, may perform, by using the above automatic retransmission mechanism, automatic retransmission on the retransmission alternative resource configured by the base station.

In the related art, the retransmission alternative resource is fixed, and the uplink traffic of each of the target UEs in the network changes constantly. If the total amount of uplink service data of multiple target UEs increases, or the uplink traffic of one or more target UEs increases abruptly, the retransmission alternative resource will be overloaded, so that the base station needs to implement retransmission of partial service data by scheduling retransmission, resulting in increased signaling overheads and increased transmission delay of the partial service data.

SUMMARY

To overcome the problems in the related art, embodiments of the present disclosure provide a method and apparatus for adjusting automatic retransmission, a base station, and user equipment, which can dynamically adjust related configuration information of automatic retransmission resources and reduce signaling overheads of the retransmission scheduling.

According to a first aspect of the embodiments of the present disclosure, there is provided a method for adjusting automatic retransmission, applied to a base station. The method includes that the base station detects uplink retransmission service information of at least two target UEs. After LBT detection performed on a grant-free uplink transmission resource in an unlicensed spectrum fails, the at least two target UEs are capable of sharing a same original retransmission alternative resource to perform automatic uplink retransmission.

Additionally, the base station determines according to the uplink retransmission service information whether the original retransmission alternative resource is overloaded and adjusts related configuration information of retransmission alternative resource to obtain adjusted retransmission configuration information in response to determining that the original retransmission alternative resource is overloaded.

Further, the base station delivers the adjusted retransmission configuration information to the at least two target UEs.

According to a second aspect of the embodiments of the present disclosure, there is provided a method for adjusting automatic retransmission, applied to a UE. The UE shares a same original retransmission alternative resource with other UEs for automatic uplink retransmission. The method includes that the UE receives adjusted retransmission configuration information delivered from a base station. The adjusted retransmission configuration information is used for instructing the UE to adjust a retransmission alternative resource based on the original retransmission alternative resource. After LBT detection performed on a grant-free uplink transmission resource fails. Further, the method includes that the UE performs uplink retransmission according to the adjusted retransmission configuration information after LBT detection performed on a grant-free uplink transmission resource fails.

According to a third aspect of the embodiments of the present disclosure, there is provided a base station including a process or a memory for storing processor-executable instructions.

The processor is configured to detect uplink retransmission service information of at least two target UEs. After LBT detection performed on a grant-free uplink transmission resource in an unlicensed spectrum fails, the at least two target UEs are capable of sharing a same original retransmission alternative resource to perform automatic uplink retransmission.

The processor is further configured to determine whether the original retransmission alternative resource is overloaded according to the uplink retransmission service information, adjust related configuration information of retransmission alternative resource to obtain adjusted retransmission configuration information in response to determining that the original retransmission alternative resource is overloaded, and deliver the adjusted retransmission configuration information to the at least two target UEs.

According to a fourth aspect of the embodiments of the present disclosure, there is provided a UE including a processor and a memory for storing processor-executable instructions.

The processor is configured to receive adjusted retransmission configuration information delivered from a base station. The adjusted retransmission configuration information is used for instructing the UE to adjust a retransmission alternative resource based on the original retransmission alternative resource.

The processor is further configured to perform uplink retransmission according to the adjusted retransmission configuration information after LBT detection performed on a grant-free uplink transmission resource fails.

It is to be understood that both the foregoing general description and the following detailed description are exemplary and explanatory only and cannot limit the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 5-1 is an application scenario diagram for adjusting automatic retransmission according to an exemplary embodiment of the present disclosure.

FIGS. 5-2 is another application scenario diagram for adjusting automatic retransmission according to an exemplary embodiment of the present disclosure.

DETAILED DESCRIPTION

Figure 1:
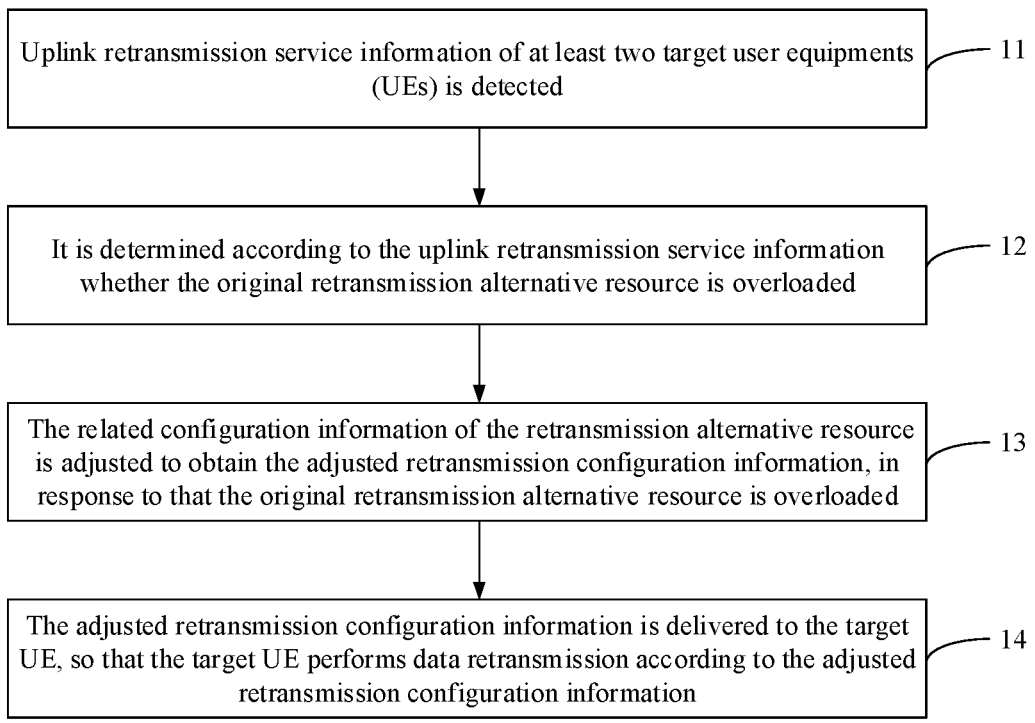
FIG. 1 is a flowchart of a method for adjusting automatic retransmission according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

The terminology used in the present disclosure is for the purpose of describing particular embodiments only and is not intended to limit the present disclosure. As used in the disclosure and the appended claims, the singular forms "a" "said" and "the" are also intended to include the plural forms unless the context clearly indicates otherwise. It is also to be understood that the term "and/or" used herein, refers to and encompasses any or all possible combinations of one or more associated listed items.

It is to be understood that while the terms first, second, third, etc., may be used in the present disclosure to describe various information, such information should not be limited to such terms. These terms are only used to distinguish the same type of information from one another. For example, the first information may also be referred to as second information without departing from the scope of the present disclosure, and similarly, the second information may also be referred to as first information. Depending on the context, the term "if" used herein may be interpreted as "in the case that" or "when" or "in response to determining".

The execution subjects related to the present disclosure includes: a base station and user equipment (UE) in a mobile communication network such as 4G Long Term Evolution (LTE), LTE-NR interworking, and 5G NR, the base station may be a base station, a sub-base station, or the like provided with a large-scale antenna array. The UE may be a user terminal, a user node, a mobile terminal, a tablet computer, and the like. In a specific implementation process, the base station and the UE are independent of each other and are in communication with each other, so as to jointly implement the technical solution provided in the present disclosure.

An application scenario of the present disclosure is as follows: a base station configures the same retransmission alternative resource for at least two target UEs, so that, after LBT detection performed on a grant-free uplink transmission resource in an unlicensed spectrum fails, the at least two target UEs can perform automatic uplink retransmission on the retransmission alternative resource. The target UE may share the same grant-free uplink transmission resource in the unlicensed spectrum with other UEs, which is referred to as the shared grant-free uplink transmission resource in the present disclosure.

With regard to LBT detection, in a wireless communication system, when an information transmitting end such as a UE needs to transmit information by using resources in an unlicensed spectrum, the idle channel detection is first performed in an unlicensed spectrum. If the detection result meets a preset channel idle evaluation rule, for example, an amount of idle unit time-frequency resources detected in a preset LBT detection interval is greater than or equal to a preset clear channel assessment (CCA) measurement value N for evaluating whether a channel is idle, it is determined that LBT detection succeeds, that is, it is determined that the current channel is in an idle state within a preset time range, that is, a channel occupation time (COT) window that may also be referred to as a transmission interval is determined, and data may be transmitted in the COT window. On the contrary, if the detection result does not meet the preset channel idle evaluation rule, it is determined that the LBT detection fails.

In the present disclosure, a set of UEs configured with the same grant-free uplink transmission resource in the unlicensed spectrum is referred to as a sharing UE group, and any UE in the sharing UE group is referred to as a sharing UE. Uplink transmission refers to that a UE sends information to a base station. When two or more sharing UEs in a sharing UE group all need to perform uplink transmission by using a current shared grant-free uplink transmission resource, each sharing UE first needs to perform LBT detection performed on the current shared grant-free uplink transmission resource. When the current shared grant-free uplink transmission resource is idle, only one sharing UE can successfully perform LBT detection and perform automatic uplink transmission; meanwhile, other sharing UEs fail in LBT detection and cannot implement automatic uplink transmission by using the current shared grant-free uplink transmission resource, at this time, the sharing UEs that fail in LBT detection can perform automatic uplink retransmission by using the retransmission alternative resource configured for the UEs by the base station.

Based on this, the present disclosure provides a method for adjusting automatic retransmission. Referring to FIG. 1, which is a flowchart of a method for retransmitting information according to an exemplary embodiment, the method may be applied to a base station, and may include the following operations 11 and 12.

In operation 11, uplink retransmission service information of at least two target user equipments (UEs) is detected, where after LBT detection performed on a grant-free uplink transmission resource in an unlicensed spectrum fails, the at least two target UEs are capable of sharing a same original retransmission alternative resource to perform automatic uplink retransmission.

In the present disclosure, after LBT detection performed on a grant-free uplink transmission resource in an unlicensed spectrum fails, the base station may configure at least two target UEs to perform automatic uplink retransmission by using a same retransmission alternative resource. Each of the target UEs belongs to a sharing UE that can share the grant-free uplink transmission resource in the unlicensed spectrum with other UEs.

For example, assuming that the base station configures UE1 to UE3 and UE4 to UE6 to share the same original retransmission alternative resource, then the base station may determine uplink retransmission service information of each of the target UEs according to a preset timing, for example, in real time, or after each retransmission scheduling of each target UE, so as to subsequently determine whether the retransmission alternative resource of each target UE is overloaded according to the uplink retransmission service information. In the present disclosure, the retransmission alternative resource currently configured by a base station for each target UE may be referred to as the original retransmission alternative resource.

In the present disclosure, the implementation of the operation 11 may include at least one of the following manners.

In a first manner, retransmission service load information of the original retransmission alternative resource is determined.

The retransmission service load information of the original retransmission alternative resource may include: information such as an amount of uplink retransmission data, a target UE identifier corresponding to the uplink retransmission data, and a number of times of uplink retransmissions of each target UE.

In the present disclosure, a base station may detect the amount of the uplink retransmission data carried by the original retransmission alternative resource, so that the base station determines whether the original retransmission alternative resource is overloaded according to the amount of current uplink retransmission data.

In a second manner, information about the abnormal retransmission scheduling configured by the base station for each of the target UEs is determined.

As to retransmission scheduling, in the present disclosure, for a target UE, such as UE1, if UE1 fails in contending for the shared uplink transmission resource within the grant-free uplink transmission period in an unlicensed spectrum, that is, UE1 fails in LBT detection on the shared uplink transmission resource, then, LBT detection is first performed on the original retransmission alternative resource to implement automatic uplink retransmission; if the UE1 also fails in LBT detection on the original retransmission alternative resource, the UE1 will request the base station to schedule retransmission resource for uplink retransmission. In the present disclosure, the retransmission scheduling of the UE1 by the base station is referred to as a normal retransmission scheduling event. That is, the normal retransmission scheduling event refers to a retransmission scheduling event performed after the LBT detection performed on the shared uplink transmission resource and the retransmission alternative resource fails because the LBT detection priority of the target UE is relatively low.

On the contrary, in the present disclosure, a retransmission scheduling event triggered due to a reason that is not a priority of the LBT detection may be referred to as an abnormal retransmission scheduling event. The reason that is not a priority of the LBT detection may include reasons such as insufficient original retransmission alternative resource, or a retransmission collision event occurring when two or more target UEs concurrently contend for the same retransmission alternative resource.

Accordingly, the base station records related information about the abnormal retransmission scheduling event of each target UE, that is, information about the abnormal retransmission scheduling, for example, time information of abnormal request by UE1 for retransmission scheduling is recorded, or information such as a number of times of abnormal retransmission schedulings configured for UE1 within a preset time window.

In operation 12, it is determined according to the uplink retransmission service information whether the original retransmission alternative resource is overloaded.

Corresponding to the implementation of the above operation 11, the implementation of the above operation 12 may also include at least one of the following implementations.

According to a first implementation, a base station may determine whether the original retransmission alternative resource is overloaded according to the amount of the uplink retransmission data carried by the original retransmission alternative resource.

Figure 2:
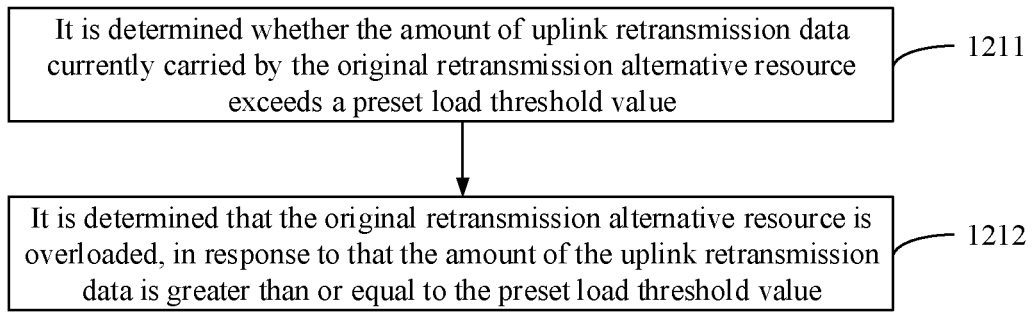
FIG. 2 is a flowchart of another method for adjusting automatic retransmission according to an exemplary embodiment of the present disclosure.

Referring to FIG. 2, which is a flowchart of another method for adjusting automatic retransmission according to an exemplary embodiment, the operation 12 may include the following operations 1211 and 1212.

In operation 1211, it is determined whether the amount of uplink retransmission data currently carried by the original retransmission alternative resource exceeds a preset load threshold value.

In the present disclosure, a base station may determine the amount of retransmission data carried by the original retransmission alternative resource and compare the amount of retransmission data with the preset load threshold value. If the amount of the retransmission data is less than the preset load threshold value, it is determined that the original retransmission alternative resource is not overloaded; otherwise, operation 1212 is performed.

In operation 1212, if the amount of the uplink retransmission data is greater than or equal to the preset load threshold value, it is determined that the original retransmission alternative resource is overloaded.

In the embodiment of the present disclosure, the base station can intuitively determine whether the original retransmission alternative resource is overloaded according to the amount of the current retransmission data carried by the original retransmission alternative resource, so as to subsequently adjust the original retransmission alternative resource in a case where the original retransmission alternative resource is overloaded.

According to a second implementation, the base station may also determine whether the original retransmission alternative resource is overloaded according to the information about the abnormal retransmission scheduling of each target UE.

Figure 3:
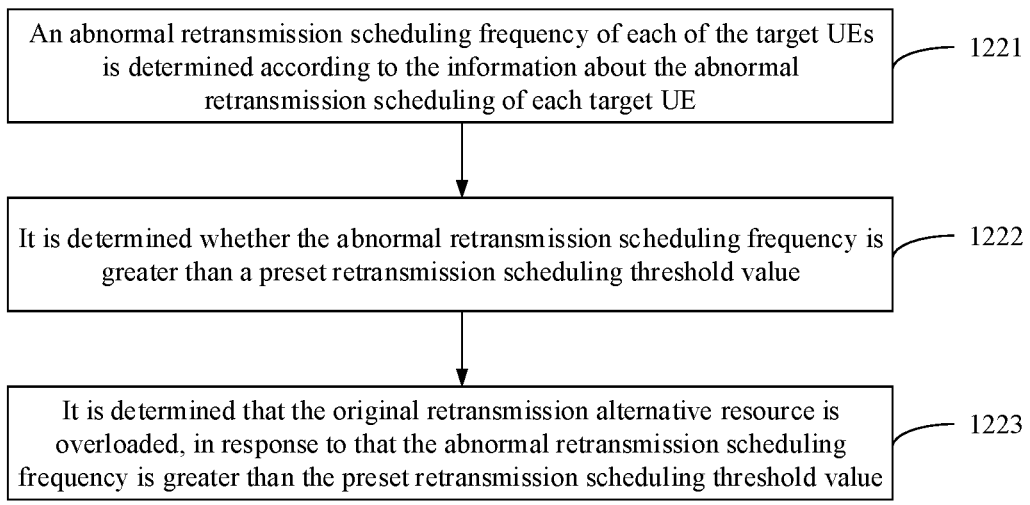
FIG. 3 is a flowchart of another method for adjusting automatic retransmission according to an exemplary embodiment of the present disclosure.

Referring to FIG. 3, which is a flowchart of another method for adjusting automatic retransmission according to an exemplary embodiment, the operation 12 may include the following operations 1221 to 1223.

In operation 1221, an abnormal retransmission scheduling frequency of each of the target UEs is determined according to the information about the abnormal retransmission scheduling of each target UE, where the abnormal retransmission scheduling frequency is a number of times of the abnormal retransmission schedulings performed by the base station for each target UE in a unit time.

In the present disclosure, the base station may count the number of times of the abnormal retransmission schedulings of each target UE within a period of time, so as to calculate the abnormal retransmission scheduling frequency.

As to how to count the information about the abnormal retransmission scheduling, in the embodiments of the present disclosure, the base station may determine whether each target UE needs to transmit an uplink service within the preset time according to the related technology, for example, according to an uplink Buffer Status Report (BSR) sent by each target UE. The base station may also determine which target UEs will fail in contending for the shared uplink transmission resources and the retransmission alternative resources according to the related technology, for example, according to the LBT detection priority configured for each target UE, so as to determine the normal retransmission scheduling event of the target UE. Based on this, the base station can count the number of times of the normal retransmission scheduling events of each target UE within a period of time, that is, the number of times of normal retransmission schedulings.

Accordingly, the base station can obtain the number of times of the abnormal retransmission schedulings of the target UE by subtracting the number of times of normal retransmission schedulings from the total number of times of retransmission schedulings of each target UE counted in a period of time.

Furthermore, the base station calculates a ratio of the number of times of the abnormal retransmission schedulings to the period of time, thereby obtaining the abnormal retransmission scheduling frequency of the target UE.

In operation 1222, it is determined whether the abnormal retransmission scheduling frequency is greater than a preset retransmission scheduling threshold value.

As described above, the reason for triggering the abnormal retransmission scheduling event includes but is not limited to insufficient original retransmission alternative resource, and the abnormal retransmission scheduling may also be triggered by a small-probability event such as a retransmission collision event.

Therefore, in the embodiment of the present disclosure, the preset retransmission scheduling threshold value may be determined according to priori information, so as to accurately determine that the abnormal retransmission scheduling event of the target UE is caused by insufficient original retransmission alternative resource.

Specifically, the base station may compare the abnormal retransmission scheduling frequency determined in operation 1221 with the preset retransmission scheduling threshold value, and if the abnormal retransmission scheduling frequency is less than or equal to the preset retransmission scheduling threshold value, the base station may determine that the original retransmission alternative resource is not overloaded; otherwise, the following operation 1223 is performed.

In operation 1223, if the abnormal retransmission scheduling frequency is greater than the preset retransmission scheduling threshold value, it is determined that the original retransmission alternative resource is overloaded.

In the embodiment of the present disclosure, the base station may indirectly determine whether the original retransmission alternative resource is overloaded by counting the occurrence frequency of the abnormal retransmission scheduling event. The scheme can be applied to an application scenario where the base station cannot directly determine whether the original retransmission alternative resource is overloaded according to the condition of the retransmission load of the retransmission alternative resource, thereby improving the intelligence degree of the base station.

In another embodiment of the present disclosure, the base station may accurately determine whether the original retransmission alternative resource is overloaded in a manner of combining the first implementation and the second implementation, so as to improve accuracy of determining whether the original retransmission alternative resource is overloaded.

In operation 13, the related configuration information of the retransmission alternative resource is adjusted to obtain the adjusted retransmission configuration information, in response to that the original retransmission alternative resource is overloaded.

After the base station determines that the original retransmission alternative resource is overloaded, the base station may adjust the related configuration information of the original retransmission alternative resource according to the related strategy to match the target UE with the retransmission alternative resource, so that it is ensured that the target UE performs automatic uplink retransmission through the retransmission alternative resource as much as possible, thereby reducing the signaling overheads of the retransmission scheduling.

In the present disclosure, in a case were the base station determines that the original retransmission alternative resource is overloaded, the base station may adjust the related configuration information of the retransmission alternative resource in at least one of the following manners.

In a first adjustment manner, information about target UEs is kept unchanged, and the retransmission alternative resource is enlarged based on the original retransmission alternative resource.

As in the above example, for each target UE such as UE1 to UE6, assuming that a periodic time-frequency range of an original retransmission alternative resource configured by the base station is (T1, f1), the base station may enlarge the retransmission alternative resource of each target UE by enlarging a time domain range and/or by enlarging a frequency domain range; or, the base station may open up a new retransmission alternative resource in the new frequency domain with a resource amount larger than the resource amount of the original retransmission alternative resource, to enable the adjusted retransmission alternative resource to carry more amount of the uplink retransmission data of each target UE, so that the success probability of implementing automatic uplink retransmission by each target UE by using the retransmission alternative resource is improved, and the overhead of the retransmission scheduling is reduced.

In a second adjustment manner, the time-frequency range of the original retransmission alternative resource is kept unchanged, and the number of target UEs that can share the original retransmission alternative resource is reduced, that is, the number of sharing UEs sharing the original retransmission alternative resource is reduced.

The implementation of the second adjustment manner may include at least two of the following cases.

According to a first case, the adjustment is performed in the level of target UE.

Figure 4:
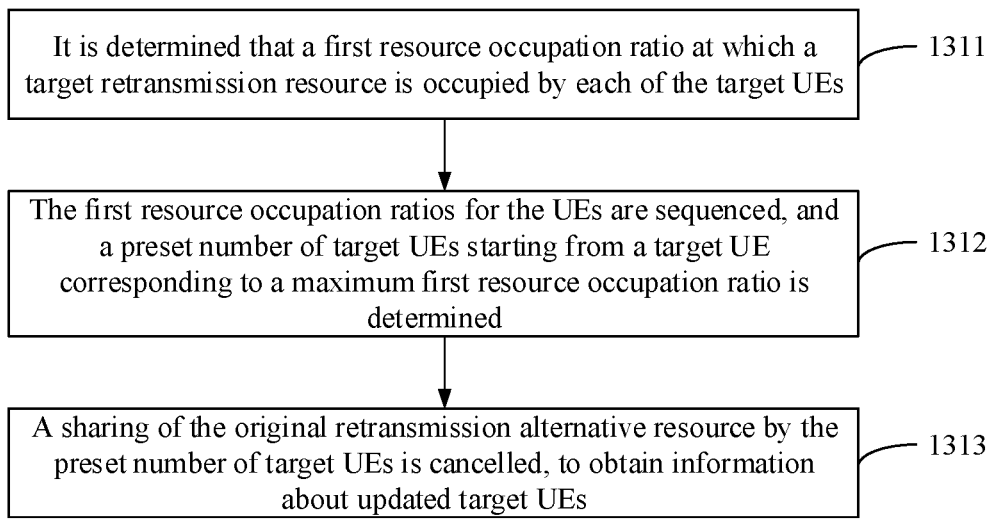
FIG. 4 is a flowchart of another method for adjusting automatic retransmission according to an exemplary embodiment of the present disclosure.

Referring to FIG. 4, which is a flowchart of another method for adjusting automatic retransmission according to an exemplary embodiment, operation 13 may include the following operations 1311 to 1313.

In operation 1311, a first resource occupation ratio at which a target retransmission resource is occupied by each of the target UEs is determined.

The target retransmission resource includes: the original retransmission alternative resource and/or the abnormal scheduling resource corresponding to the abnormal retransmission scheduling. The abnormal scheduling resource refers to an uplink retransmission resource scheduled by the base station for each target UE in a case where the retransmission requirement of the target UE exceeds a carrying capability of the original retransmission alternative resource.

Depending on different cases for the original retransmission alternative resource overload, the range of the resource included in the target retransmission resource is also different. The cases of the original retransmission alternative resource overload determined in operation 12 may include the following two overload cases.

In a first overload case, the amount of the retransmission data of the target UE is greater than or equal to the preset load threshold value, but not exceeds the carrying capacity of the original retransmission alternative resource. If the preset load threshold value is a preset ratio threshold value, that is, the ratio of the retransmission service of the target UE to the original retransmission alternative resource is greater than or equal to the preset ratio threshold value, such as 80%, but less than 100%, then this case is a judgment result of the first implementation of the above-mentioned operation 12.

In a second overload case, the amount of retransmission data of the target UE exceeds the carrying capability of the original retransmission alternative resource. This case is another judgment result of the first implementation of the operation 12, or a judgment result of the second implementation of the operation 12.

Corresponding to the first overload case, that is, in a case where the retransmission requirement of the target UE is about to exceed the carrying capability of the original retransmission alternative resource, the target retransmission resource may include the original retransmission alternative resource.

Corresponding to the second overload case, that is, in a case where the amount of the retransmission data of the target UE exceeds the carrying capability of the original retransmission alternative resource, the target retransmission resource may include the abnormal scheduling resource corresponding to the abnormal retransmission scheduling.

In another embodiment of the present disclosure, for the second overload case, the target retransmission resource may also include: the abnormal scheduling resource and the original retransmission alternative resource. In the embodiment of the present disclosure, for the second overload case, it is possible to more accurately determine which target UE has a relatively large retransmission traffic, so as to subsequently adjust the retransmission alternative resource of the target UE.

In operation 1312, the first resource occupation ratios for the UEs are sequenced, and a preset number of target UEs starting from a target UE corresponding to a maximum first resource occupation ratio is determined.

In operation 1313, a sharing of the original retransmission alternative resource by the preset number of target UEs is cancelled, to obtain information about updated target UEs.

Assuming that the target retransmission resource includes the original retransmission alternative resource. The base station may determine the occupation ratio of the original retransmission alternative resource occupied by each target UE for according to the related technology, for example, according to a transmission number corresponding to the uplink automatic retransmission of each target UE carried by the original retransmission alternative resource, and the occupation ratio may be referred to as the first resource occupation ratio in the present disclosure.

The base station may sequence the first resource occupation ratios for the target UEs in a preset order, for example, from in a descending order or in an ascending order, and may determine, according to the sequencing result, a preset number of target UEs starting from the target UE corresponding to a maximum first resource occupation ratio in a descending order of first resource occupation ratios; and the base station may cancel the sharing of the original retransmission alternative resource by the preset number of the target UEs.

For example, assuming that the original retransmission alternative resource carries retransmission services of UE2, UE3 and UE5, and the first resource occupation ratios corresponding to UE2, UE3, and UE5 are determined to be 10%, 25% and 50%, respectively, then, the base station may sequence the first resource occupation ratios for target UEs as shown in Table 1.

TABLE 1

| Sequence number | UE identification | First resource occupation ratio |
|---|---|---|
| 1 | UE5 | 50% |
| 2 | UE3 | 25% |
| 3 | UE2 | 10% |

The base station cancels a target UE with a large resource occupation ratio according to the sequencing result shown in the foregoing Table 1, that is, cancels the sharing of the original retransmission alternative resource by the UE5.

After the adjustment above, updated target UEs corresponding to the original retransmission alternative resource include UE1, UE2, UE3, UE4, and UE6.

In another embodiment of the present disclosure, after the operation 1311, the base station may also compare the first resource occupation ratio of each of the target UEs with a preset ratio threshold value; and if the first resource occupation ratio for the current target UE is greater than or equal to the preset ratio threshold value, the base station cancels the sharing of the original retransmission alternative resource by the current target UE.

Still in the above example, after the base station determines that the first resource occupation ratios corresponding to the UE2, the UE3, and the UE 5 are 10%, 25%, and 50%, the base station may compare the first resource occupation ratio of each target UE with a preset ratio threshold value, such as 40%. If the first resource occupation ratio of one target UE is greater than or equal to the preset ratio threshold value, such as the above UE5, the base station may cancel the sharing of the original retransmission alternative resource by the target UE, such as the UE5, so as to determine the information about adjusted target UEs that can share the original retransmission alternative resource.

Accordingly, the base station may generate the adjusted retransmission configuration information based on the information about the adjusted target UEs. The adjusted retransmission configuration information is used for informing the target UE whose sharing is cancelled, such as the UE5, to prohibit the target UE whose sharing is cancelled from subsequently performing automatic uplink retransmission by using the original retransmission alternative resource.

Similarly, for a case where the target retransmission resource includes an abnormal scheduling resource, or the original retransmission alternative resource and the foregoing abnormal scheduling resource, the target UEs may be adjusted with reference to the foregoing embodiments, and details are not described herein again.

For the first case, the operation 13 may further include: a new uplink retransmission alternative resource is configured for the target UEs whose sharing is cancelled. In the embodiment of the present disclosure, when the target UEs whose sharing is cancelled need to retransmit service information subsequently, although automatic retransmission by using an original retransmission alternative resource is prohibited, automatic retransmission may be implemented on a new retransmission alternative resource configured by the base station, and the retransmission delay of the target UE whose sharing is cancelled may still be reduced.

According to a second case, the adjustment is performed in the level of the sharing terminal group, and the adjustment is applicable to an application scenario in which all UEs in at least two sharing terminal groups share the original retransmission alternative resource.

In the present disclosure, a set of UEs configured with the same grant-free uplink transmission configuration information in an unlicensed spectrum may be referred to as a sharing terminal group, and any UE in the sharing terminal group may be referred to as the target UE. When two or more target UEs in a sharing terminal group need to perform uplink transmission by using the same periodic uplink transmission resource, that is, the current shared uplink transmission resource, each target UE first needs to perform LBT detection on the current shared uplink transmission resource. When the current shared uplink transmission resource is idle, only one target UE can perform LBT detection successfully so as to perform automatic uplink transmission. The other target UEs fail in the LBT detection, and cannot implement uplink transmission by using the current shared uplink transmission resource, then, the target UE that fails in the LBT detection can perform automatic uplink retransmission by using the retransmission alternative resource configured by the base station.

Figures 1, 5:
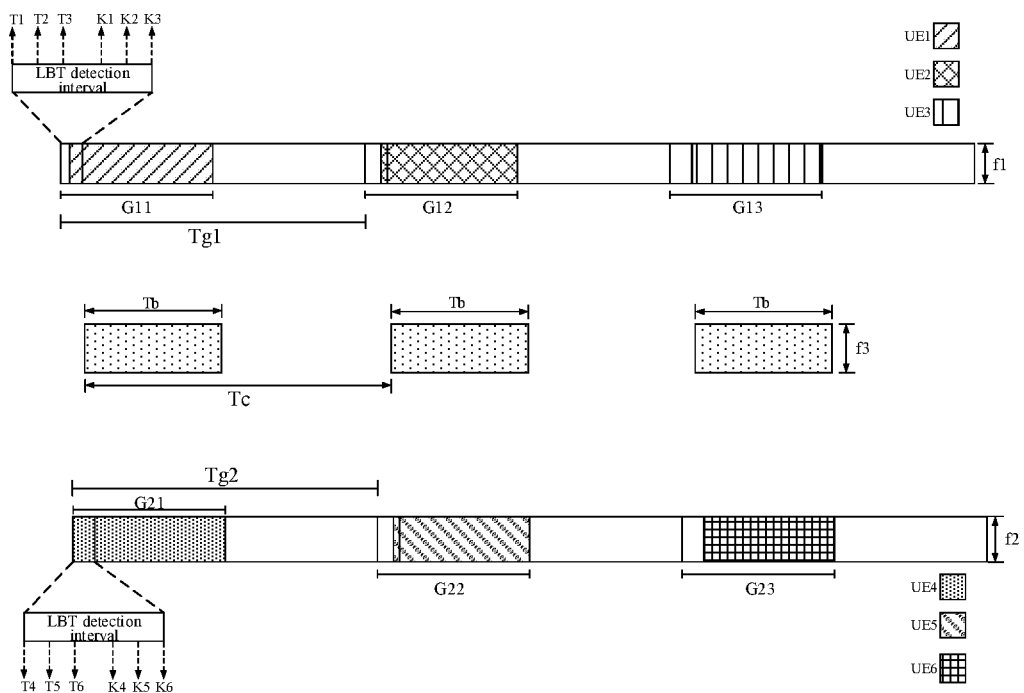
Figures 2, 5:
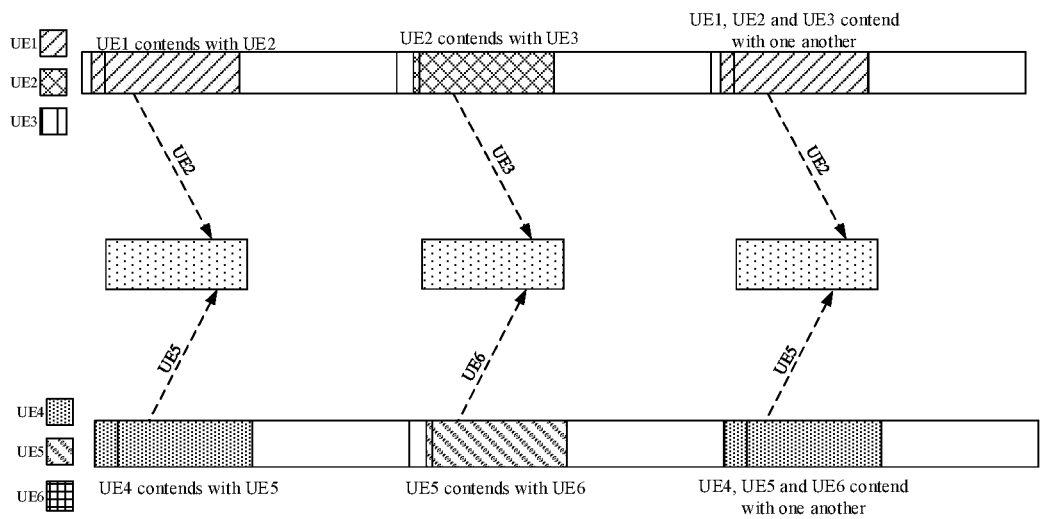

Exemplarily, referring to FIG. 5-1, which is an application scenario diagram for adjusting automatic retransmission according to an exemplary embodiment of the present disclosure, the sharing terminal group G1 includes UE1 to UE3; the sharing terminal group G2 includes UE4 to UE6. The UE1 to UE6 may share the original retransmission alternative resource (Tb, f3) arriving periodically, and Tc is a transmission period of the shared retransmission alternative resource. Each UE in the sharing terminal group G1 shares the grant-free uplink transmission resource, such as (G11, f1), (G12, f1), and (G13, f1), which arrives periodically at Tg1 in the frequency range f1. The LBT detection priorities of UE1, UE2, and UE3 for each shared grant-free uplink transmission resource such as (G11, f1) are represented by start times of the LBT detection, denoted by T1, T2, and T3, respectively; the corresponding start times of transmission are denoted by K1, K2, and K3, respectively. As can be seen from FIG. 5-1, the LBT detection priorities of UE1, UE2, and UE3 decrease sequentially.

Similarly, in the sharing terminal group G2, LBT detection priorities of UE4, UE5, and UE6 for the shared grant-free uplink resources such as (G21, f2), (G22, f2), and (G23, f2) are denoted by T4, T5, and T6, respectively, and corresponding start times of transmission are denoted by K4, K5, and K6, respectively. As can be seen from FIG. 5-1, the LBT detection priorities of UE4, UE5, and UE6 also decease sequentially.

FIG. 5-1 shows a case where each sharing UE does not have a contention relationship for a shared grant-free uplink transmission resource, that is, there is no case in which two or more sharing UEs in a sharing terminal group simultaneously perform LBT detection on a shared grant-free uplink transmission resource.

Accordingly, FIG. 5-2 shows a case where each sharing UE has a contention relationship for a shared grant-free uplink transmission resource. As shown in FIG. 5-2, when the UE1 and the UE2 need to perform transmission on the grant-free uplink transmission resource (G11, f1) at the same time, since the LBT detection priority of the UE1 is higher than the LBT detection priority of the UE2, the UE2 fails in performing the LBT detection, and thus automatically performs the LBT detection on the original retransmission alternative resources (Tb, f3) so as to perform the automatic uplink retransmission using the original retransmission alternative resource.

Similarly, when the UE4 and the UE5 in the sharing terminal group G2 need to perform transmission on the grant-free uplink transmission resource (G21, f2) at the same time, since the LBT detection priority of the UE4 is higher than the LBT detection priority of the UE5, the UE5 fails in performing the LBT detection, and thus automatically performs the LBT detection on the original retransmission alternative resource (Tb, f3) so as to perform the automatic uplink retransmission using the original retransmission alternative resource. By such analogy, when multiple sharing UEs contend for the same grant-free uplink transmission resource or retransmission alternative resource at the same time, the UE with a higher the LBT detection priority will succeed in the detection.

Figure 6:
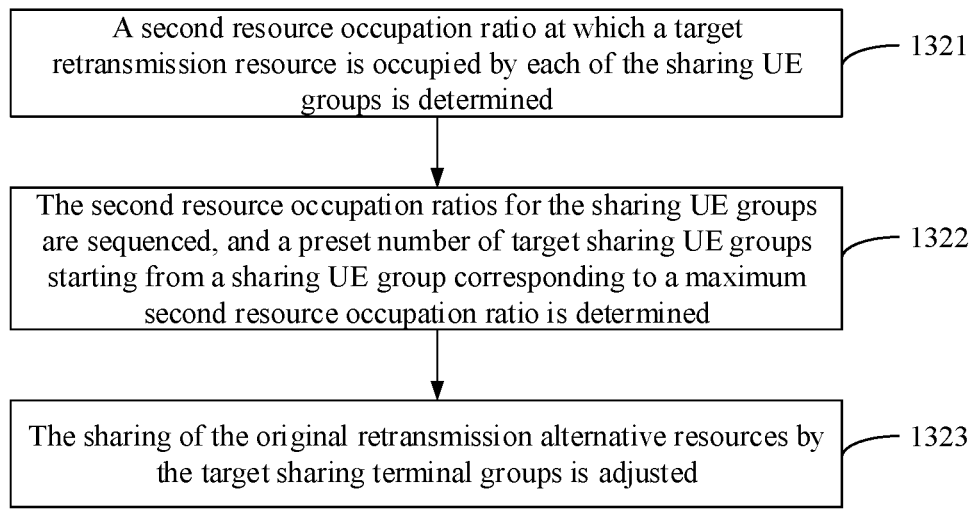
FIG. 6 is a flowchart of another method for adjusting automatic retransmission according to an exemplary embodiment of the present disclosure.

Based on this, referring to FIG. 6, which is a flowchart of another method for adjusting automatic retransmission according to an exemplary embodiment, the above-described operation 13 may include the following operations 1321 to 1323.

In operation 1321, a second resource occupation ratio at which a target retransmission resource is occupied by each of the sharing UE groups is determined.

In this embodiment of the present disclosure, the target retransmission resource may also include the original retransmission alternative resource and/or the abnormal scheduling resource corresponding to abnormal retransmission scheduling. For a description of the target retransmission resource, reference may be made to the embodiment shown in FIG. 4, and details are not described herein.

In operation 1322, the second resource occupation ratios for the sharing UE groups are sequenced, and a preset number of target sharing UE groups starting from a sharing UE group corresponding to a maximum second resource occupation ratio is determined.

In another embodiment of the present disclosure, according to the size of the second resource occupation ratio, the base station may determine which sharing terminal groups have more uplink retransmission traffic according to a preset strategy, such as comparing with a preset threshold value, so that the base station adjusts the target sharing terminal groups to reduce the uplink retransmission traffic of the sharing terminal group(s) on the original retransmission alternative resource.

In operation 1323, the sharing of the original retransmission alternative resource by the target sharing terminal groups is adjusted.

The implementation of operation 1323 includes at least the following two manners.

In a first manner, sharing of the original retransmission alternative resource by the target sharing UE groups is cancelled.

Referring still to the above example, assuming that UE1 to UE3 belong to the sharing terminal group G1, and UE4 to UE6 belong to the sharing terminal group G2. The base station may determine, according to related technology, the occupation ratio at which a target retransmission resource is occupied by each of the sharing UE groups, that is, a second resource occupation ratio, for example, if the second resource occupation ratio of G1 is 80%, and the second resource occupation ratio of G2 is 20%, it is indicated that a large number of uplink retransmission services currently exist in the sharing terminal group G1, and the base station may cancel sharing of the original retransmission alternative resource by the sharing terminal group G1.

There are also two implementations as to how to cancel the sharing of the original retransmission alternative resource by the sharing terminal group G1.

According to the first implementation, the target sharing terminal group is reserved, but it is no longer configured to perform automatic uplink retransmission using the original retransmission alternative resource. In this manner, the operation 1323 may further include: a new retransmission alternative resource is configured for the target sharing terminal group. This implementation is a combination of reducing the number of sharing UEs sharing the original retransmission alternative resource and enlarging the retransmission alternative resource, that is, a combination of the first adjustment manner and the second adjustment manner.

Accordingly, the adjusted retransmission configuration information generated by the base station is not only used for informing each target UE in the target sharing terminal group to prohibit automatic uplink retransmission by using the original retransmission alternative resource, but also used for informing each target UE to perform uplink automatic retransmission on the new retransmission alternative resource.

According to the second implementation, the target sharing terminal group is cancelled, that is, the sharing of the shared uplink transmission resource by each target UE in the target sharing terminal group is cancelled. For example, for the target sharing terminal group G1, if the sharing is cancelled, the UE1, UE2, and UE3 will no longer share the same periodic grant-free uplink transmission resource.

Accordingly, the adjusted retransmission configuration information generated by the base station is used for informing each target UE in the target sharing terminal group to prohibit automatic uplink retransmission by using the original retransmission alternative resource.

According to a second manner, the number of target UEs in the target sharing terminal group is reduced according to the uplink retransmission traffic of each target UE in the target sharing terminal group, that is, the contribution of each target UE to the second resource occupation ratio.

In the present disclosure, if a sharing terminal group occupies a large amount of retransmission alternative resources, it is indicated that the sharing terminal group has a demand for transmission of a large number of uplink retransmission serviced. There may be two reasons for causing the large amount of uplink retransmission service transmission of a sharing terminal group. The first reason is that the grouping of the sharing terminal group is unreasonable. For example, at least two sharing UEs in the sharing terminal group cannot detect each other's information transmission, so that LBT detection results obtained by both parties when contending for the same shared uplink transmission resource are inaccurate, resulting in a large number of uplink transmission collision events. The uplink transmission collision event is an event in which at least two of the sharing UEs in the sharing terminal group succeed in LBT detection at the same time but both fail in transmission by using the same uplink transmission resource. The second reason is that the uplink transmission traffic of one or more sharing UEs in the sharing terminal group increases rapidly, and excessive shared uplink transmission resources or original retransmission alternative resources are occupied.

Based on this, in the present disclosure, the number of sharing UEs in each target sharing terminal group can be reduced according to the source of the uplink retransmission service of each target sharing terminal group.

Figure 7:
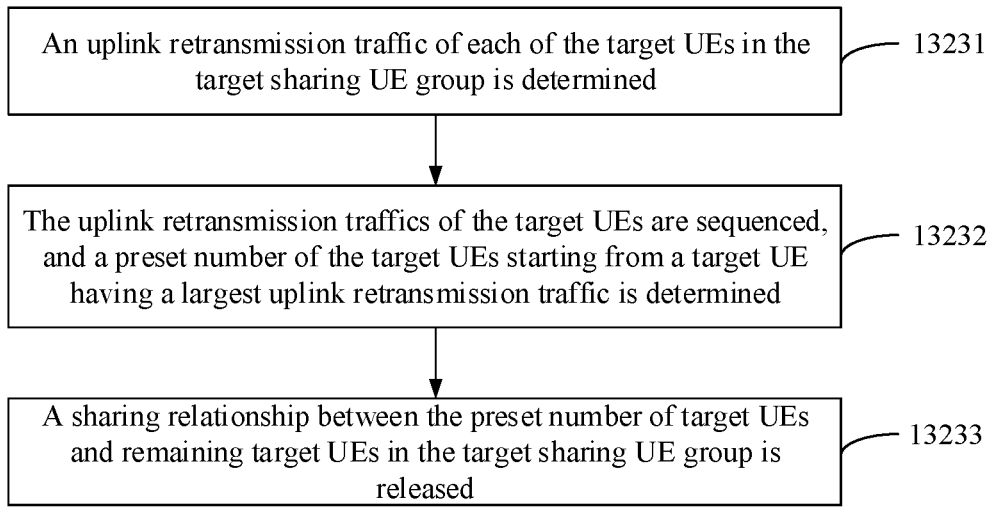
FIG. 7 is a flowchart of another method for adjusting automatic retransmission, according to an exemplary embodiment of the present disclosure.

Referring to FIG. 7, which is a flowchart of another method for adjusting automatic retransmission according to an exemplary embodiment, the operation 1323 may include the following operations 13231 to 13233.

In operation 13231, an uplink retransmission traffic of each of the target UEs in the target sharing UE group is determined.

In operation 13232, the uplink retransmission traffics of the target UEs are sequenced, and a preset number of the target UEs starting from a target UE having a largest uplink retransmission traffic is determined.

In operation 13233, a sharing relationship between the preset number of target UEs and remaining target UEs in the target sharing UE group is released.

In this embodiment of the present disclosure, for a target sharing terminal group, taking the sharing terminal group G1 as an example, the base station may further determine the uplink retransmission traffic of each target UE in the target sharing terminal group, and sequence the uplink retransmission traffics for the target UEs, furthermore, remove, from the target sharing UE group, a preset number of target UEs that contribute more to the second resource occupation ratio, for example, if the preset number is one, the target UE with the largest uplink retransmission traffic, such as UE2, can be determined and removed from the $_{[HT1]}$sharing terminal group, so that the number of target UEs included in the target sharing terminal group is reduced, for example, the current sharing terminal group G1 includes UE1 and UE3, thereby reducing uplink retransmission requirements of the target sharing terminal group.

In another embodiment of the present disclosure, after operation 13231, the base station may also compare the uplink retransmission traffic of each target UE with a preset traffic threshold value. If the uplink retransmission traffic of the current target UE is greater than or equal to the preset traffic threshold value, the sharing relationship between the current target UE such as UE2 and the remaining target UEs in the target sharing terminal group such as UE1 and UE3 in G1 is released. It will be appreciated that after the current target UE, such as UE2, is removed from the sharing terminal group, such as G1, in the subsequent transmission process, the UE2 will no longer share the periodic grant-free uplink transmission resource in the unlicensed spectrum with the remaining UE1 and UE3 in the sharing terminal group G1. Naturally, the target UE is no longer qualified to share the original retransmission alternative resource, that is, the target UE such as UE2 naturally belongs to the target UE whose sharing of the original retransmission candidate resource is cancelled.

In another embodiment of the present disclosure, the operation 1323 may further include: a periodic grant-free uplink transmission resource in an unlicensed spectrum is configured for the target UE whose sharing relationship is cancelled.

In this embodiment of the present disclosure, the base station may separately configure the periodic grant-free uplink transmission resource in an unlicensed spectrum for the target UE whose sharing relationship is released. For example, the periodic grant-free uplink transmission resource in the unlicensed spectrum is configured for the UE2 whose sharing is cancelled, so that the UE2 performs automatic uplink transmission by using the separate grant-free uplink transmission resource, and no longer shares the grant-free uplink transmission resource with other UEs, thereby reducing an uplink transmission delay of the target UE whose sharing relationship is released, and improving the efficiency of uplink data transmission.

Accordingly, the base station may generate the adjusted retransmission configuration information according to the related configuration information of the adjusted retransmission alternative resource.

Corresponding to the above embodiments, the base station may generate the adjusted retransmission configuration information according to the adjusted retransmission alternative resource and/or the information about adjusted target UEs, so as to inform the target UE of the configuration change of the retransmission alternative resource.

Based on the first adjustment manner, the base station may determine the first type of the adjusted retransmission configuration information according to the enlarged time-frequency range of the retransmission alternative resource. The first type of the adjusted retransmission configuration information is used for inform the time-frequency range of the new retransmission alternative resource to each target UE, so that each target UE can accurately locate the new retransmission alternative resource according to the adjusted retransmission configuration information.

Based on the second adjustment manner, the base station may determine the second type of the adjusted retransmission configuration information according to the reduced target UEs. The second type of the adjusted retransmission configuration information is used for informing the target UE whose sharing is cancelled to prohibit automatic uplink retransmission by using the original retransmission alternative resource when the uplink service information needs to be retransmitted subsequently, and/or for informing the target UE to independently open up a new retransmission alternative resource. In the present disclosure, the target UE whose sharing is cancelled refers to a target UE that is cancelled from sharing the original retransmission alternative resource to perform automatic retransmission.

In operation 14, the adjusted retransmission configuration information is delivered to the target UE, so that the target UE performs data retransmission according to the adjusted retransmission configuration information.

Accordingly, if the adjusted retransmission configuration information is the first type of adjusted retransmission configuration information, the operation 14 may be specifically as following operation.

The adjusted retransmission configuration information is sent to each of the target UEs, to enable the UE to perform uplink automatic retransmission by using the enlarged retransmission alternative resource.

If the adjusted retransmission configuration information is the second type of adjusted retransmission configuration information, the operation 14 may be specifically as following operation.

The adjusted retransmission configuration information is sent to the target UE(s) whose sharing is cancelled.

In the present disclosure, the base station may send the adjusted retransmission configuration information to the target UE by using upper layer signaling or physical layer signaling. The upper layer signaling may be Radio Resource Control (RRC) signaling or Medium Access Control (MAC) Control Element (CE) signaling.

In summary, according to the method for adjusting automatic retransmission provided in the present disclosure, when the base station determines that the original retransmission alternative resource is overloaded, a matching relationship between the retransmission alternative resource and the target UEs that can share the retransmission alternative resource can be dynamically adjusted, so that each of the target UEs can successfully implement automatic uplink retransmission by using the retransmission alternative resource, thereby reducing an uplink retransmission delay of the target UEs.

Accordingly, the present disclosure also provides a method for adjusting automatic retransmission applied to a UE. After LBT detection performed on a grant-free uplink transmission resource in an unlicensed spectrum performed by the terminal fails, the UE is capable of sharing a same original retransmission alternative resource with other UE to perform automatic uplink retransmission.

Figure 8:
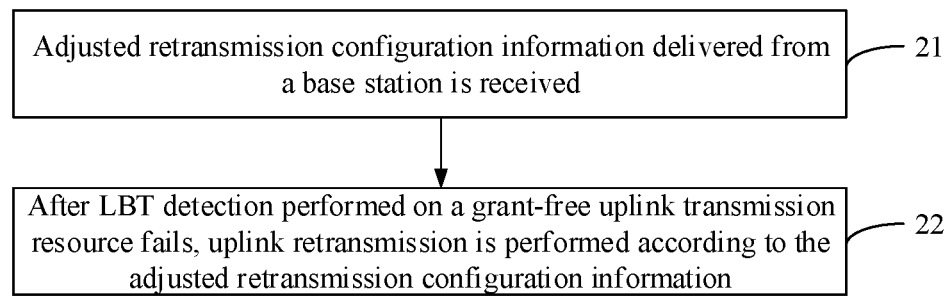
FIG. 8 is a flowchart of a method for adjusting automatic retransmission according to an exemplary embodiment of the present disclosure.

Referring to FIG. 8, which is a flowchart of a method for adjusting automatic retransmission according to an exemplary embodiment, the method may include the following operations 21 and 22.

In operation 21, adjusted retransmission configuration information delivered is received from a base station, where the adjusted retransmission configuration information is used for instructing the UE to adjust a retransmission alternative resource based on the original retransmission alternative resource.

In operation 22, after LBT detection performed on a grant-free uplink transmission resource fails, uplink retransmission is performed according to the adjusted retransmission configuration information.

In one embodiment, taking the current UE being UE1 as an example, the adjusted retransmission configuration information may be used to instruct the UE1 to perform automatic uplink retransmission on a new retransmission alternative resource.

Figure 9:
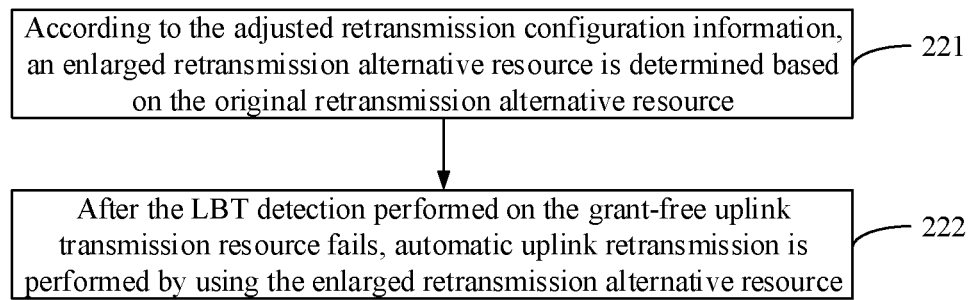
FIG. 9 is a flowchart of another method for adjusting automatic retransmission, according to an exemplary embodiment of the present disclosure.

Referring to FIG. 9, which is a flowchart of a method for adjusting automatic retransmission according to an exemplary embodiment, the above-described operation 22 may include the following operations 221 and 222.

In operation 221, according to the adjusted retransmission configuration information, an enlarged retransmission alternative resource is determined based on the original retransmission alternative resource.

In this embodiment of the present disclosure, after receiving the adjusted retransmission configuration information, the UE1 may determine the enlarged retransmission alternative resource based on the original retransmission alternative resource. The enlarged retransmission alternative resource may be enlarged in the time domain and/or enlarged in the frequency domain relative to the original retransmission alternative resource.

In operation 222, after the LBT detection performed on the grant-free uplink transmission resource fails, automatic uplink retransmission is performed by using the enlarged retransmission alternative resource.

After determining the enlarged retransmission alternative resource, if the UE1 fails in the LBT detection on the grant-free uplink transmission resource, uplink automatic transmission may be performed by using the enlarged retransmission alternative resource.

In another embodiment of the present disclosure, the adjusted retransmission configuration information is used for instructing the UE1 to prohibit automatic uplink retransmission by using the original retransmission alternative resource.

In the present disclosure, if the uplink retransmission traffic of the UE1 is large, and the occupation ratio of UE1 for the original retransmission alternative resource within a period of time exceeds the preset threshold value, it is possible to receive the adjusted retransmission configuration information delivered from the base station, where the adjusted retransmission configuration information is used for instructing the UE1 to prohibit automatic uplink retransmission by using the original retransmission alternative resource. In this case, after the UE1 fails in the LBT detection on the grant-free uplink transmission resource, the UE1 implements uplink retransmission on the newly acquired retransmission resource.

In an embodiment of the present disclosure, the UE1 may request, according to the related technology, a base station to schedule a retransmission resource for the UE1, and perform uplink retransmission by using the retransmission resource scheduled by the base station for the UE1.

In another embodiment of the present disclosure, if a new retransmission alternative resource is configured by the base station, and the new retransmission alternative resource is different from the original retransmission alternative resource in a time-frequency range, then, after the UE1 fails in the LBT detection on the grant-free uplink transmission resource, the UE1 may implement uplink automatic retransmission by using the new retransmission alternative resource configured for the UE1 by the base station.

For the purpose of simplicity of description, each of the foregoing method embodiments is described as a series of combinations of acts, but it will be appreciated by those skilled in the art that the present disclosure is not limited by the order of acts described, as certain operations may be performed in other orders or simultaneously in accordance with the present disclosure.

Second, those skilled in the art should also appreciate that the embodiments described in the description are all alternative embodiments and that the actions and modules involved are not necessarily required by the present disclosure.

Corresponding to the foregoing application function implementation method embodiments, the present disclosure also provides embodiments of application function implementation apparatuses and a corresponding terminal.

Figure 10:
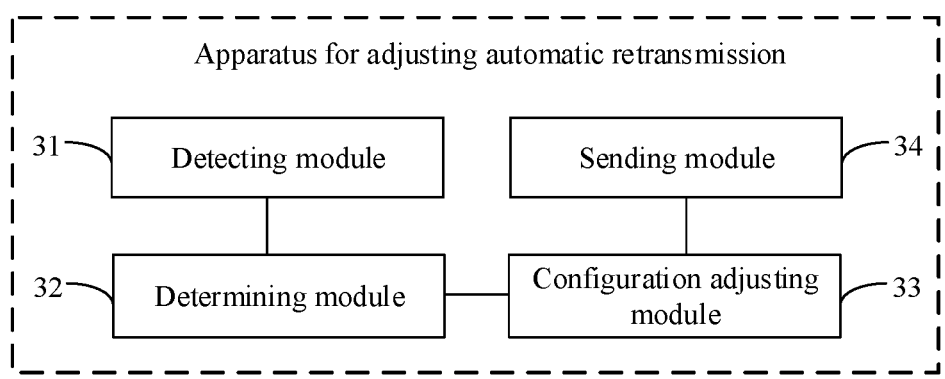
FIG. 10 is a block diagram of an apparatus for adjusting automatic retransmission according to an exemplary embodiment of the present disclosure.

Referring to FIG. 10, a block diagram of an apparatus for adjusting automatic retransmission according to an exemplary embodiment, the apparatus is provided in a base station, the apparatus may include a detecting module 31, a determining module 32, a configuration adjusting module 33 and sending module 34.

The detecting module 31 is configured to detect uplink retransmission service information of at least two target user equipments (UEs), wherein after listen before talk (LBT) detection performed on a grant-free uplink transmission resource in an unlicensed spectrum fails, the at least two target UEs are capable of sharing a same original retransmission alternative resource to perform automatic uplink retransmission.

The determining module 32 is configured to determine whether the original retransmission alternative resource is overloaded according to the uplink retransmission service information.

The configuration adjusting module 33 is configured to adjust related configuration information of retransmission alternative resource to obtain adjusted retransmission configuration information, in response to that the original retransmission alternative resource is overloaded.

The sending module 34 is configured to deliver the adjusted retransmission configuration information to the target UEs, to enable the target UEs to perform data retransmission according to the adjusted retransmission configuration information.

Figure 11:
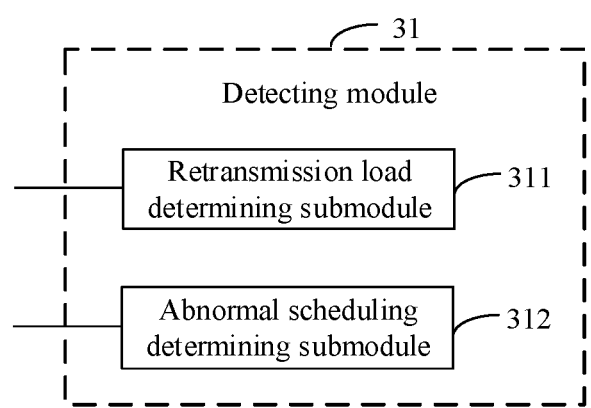
FIG. 11 is a block diagram of another apparatus for adjusting automatic retransmission according to an exemplary embodiment of the present disclosure.

Referring to FIG. 11, which is a block diagram of another apparatus for adjusting automatic retransmission according to an exemplary embodiment, the detecting module 31 may include at least one of the following sub-modules on the basis of the apparatus embodiment shown in FIG. 10: a retransmission load determining submodule 311, or a abnormal scheduling determining submodule 312.

The retransmission load determining submodule 311 is configured to determine retransmission service load information of the original retransmission alternative resource.

The abnormal scheduling determining submodule 312 is configured to determine information about abnormal retransmission abnormal configured by the base station for each of the target UEs, wherein the abnormal retransmission scheduling is a retransmission scheduling event triggered due to a reason that is not a priority of the LBT detection.

Figure 12:
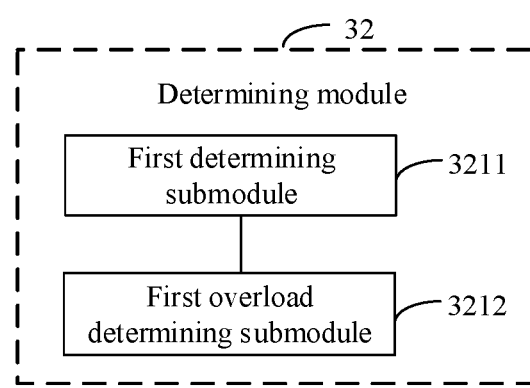
FIG. 12 is a block diagram of another apparatus for adjusting automatic retransmission according to an exemplary embodiment of the present disclosure.

In an apparatus embodiment of the present disclosure, if the detecting module 31 includes the retransmission load determining submodule 311, referring to FIG. 12, which is a block diagram of another apparatus for adjusting automatic retransmission according to an exemplary embodiment, on the basis of the apparatus embodiment shown in FIG. 11, the determining module 32 may include: a first determining submodule 3211, and first overload determining submodule 3212.

The first determining submodule 3211 is configured to determine whether an amount of uplink retransmission data currently carried by the original retransmission alternative resource exceeds a preset load threshold value The first overload determining submodule 3212 is configured to determine that the original retransmission alternative resource is overloaded, in response to that the amount of the uplink retransmission data is greater than or equal to the preset load threshold value.

Figure 13:
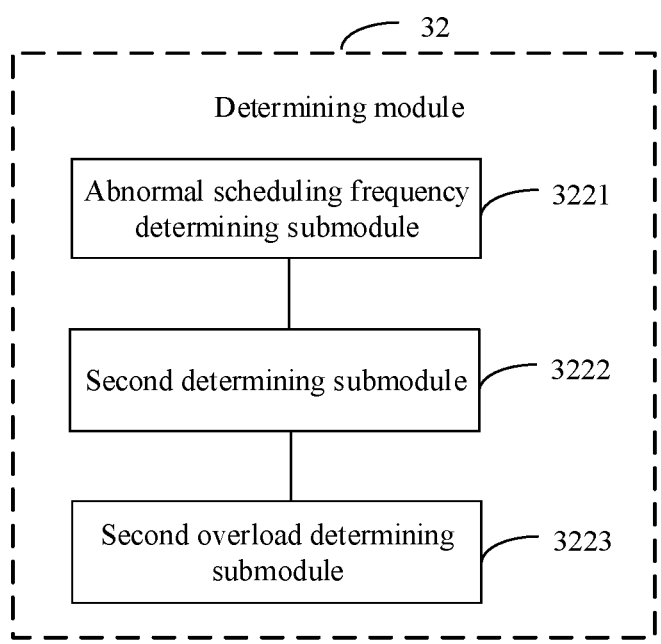
FIG. 13 is a block diagram of another apparatus for adjusting automatic retransmission according to an exemplary embodiment of the present disclosure.

In another apparatus embodiment of the present disclosure, if the detecting module 31 includes the abnormal scheduling determining submodule 312, referring to FIG. 13, which is a block diagram of another apparatus for adjusting automatic retransmission according to an exemplary embodiment, on the basis of the apparatus embodiment shown in FIG. 11, the determining module 32 may include: an abnormal scheduling frequency determining submodule 3221, a second determining submodule 3222 and a second overload determining submodule 3223.

The abnormal scheduling frequency determining submodule 3221 is configured to determine an abnormal retransmission scheduling frequency of each of the target UEs according to the information about the abnormal retransmission scheduling of each target UE, wherein the abnormal retransmission scheduling frequency is a number of times of the abnormal retransmission schedulings performed by the base station for each target UE in a unit time.

The second determining submodule 3222 is configured to determine whether the abnormal retransmission scheduling frequency is greater than a preset retransmission scheduling threshold value.

The second overload determining submodule 3223 is configured to determine that the original retransmission alternative resource is overloaded, in response to that the abnormal retransmission scheduling frequency is greater than the preset retransmission scheduling threshold value.

Figure 14:
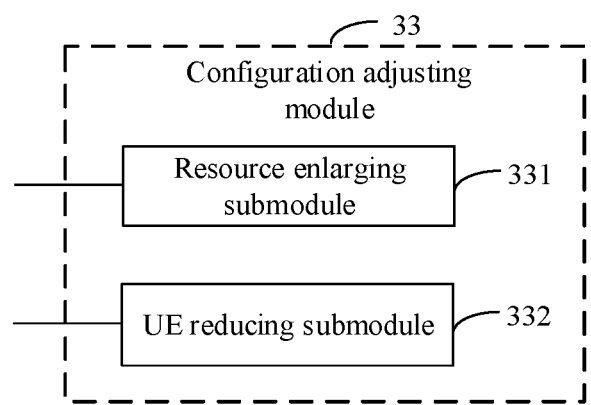
FIG. 14 is a block diagram of another apparatus for adjusting automatic retransmission according to an exemplary embodiment of the present disclosure.

Referring to FIG. 14, which is a block diagram of another apparatus for adjusting automatic retransmission according to an exemplary embodiment, on the basis of the apparatus embodiment shown in FIG. 10, the configuration adjusting module 33 may include at least one of: a resource enlarging submodule 331, or a UE reducing submodule 332.

The resource enlarging submodule 331 is configured to enlarge the retransmission alternative resource based on the original retransmission alternative resource The UE reducing submodule 332 is configured to reduce a number of sharing UEs sharing the original retransmission alternative resource.

Figure 15:
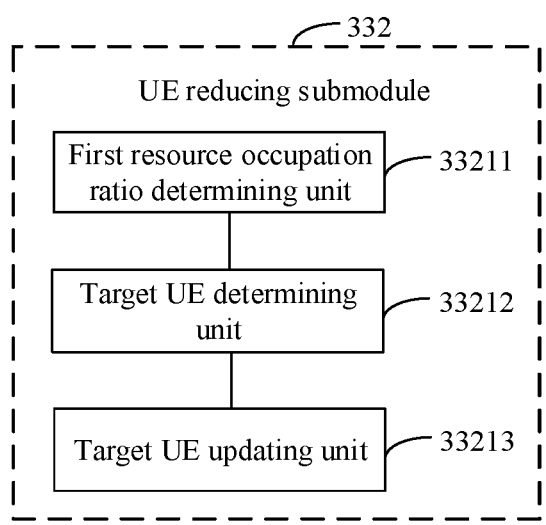
FIG. 15 is a block diagram of another apparatus for adjusting automatic retransmission according to an exemplary embodiment of the present disclosure.

Referring to FIG. 15, which is a block diagram of another apparatus for adjusting automatic retransmission according to an exemplary embodiment, on the basis of the apparatus embodiment shown in FIG. 14, the UE reducing submodule 332 may include: a first resource occupation ratio determining unit 33211, target UE determining unit 33212 and target UE updating unit 33213.

The first resource occupation ratio determining unit 33211 is configured to determine a first resource occupation ratio at which a target retransmission resource is occupied by each of the target UEs, wherein the target retransmission resource includes at least one of the original retransmission alternative resource or an abnormal scheduling resource corresponding to an abnormal retransmission scheduling.

The target UE determining unit 33212 is configured to sequence the first resource occupation ratios for the UEs, and determine a preset number of target UEs starting from a target UE corresponding to a maximum first resource occupation ratio.

The target UE updating unit 33213 is configured to cancel a sharing of the original retransmission alternative resource by the preset number of target UEs, to obtain information about updated target UEs.

Figure 16:
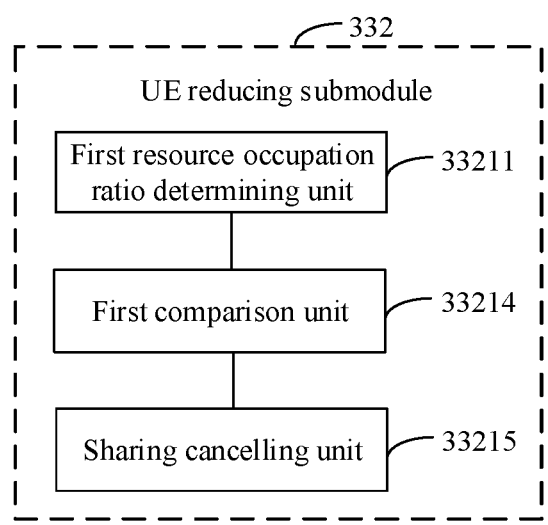
FIG. 16 is a block diagram of another apparatus for adjusting automatic retransmission according to an exemplary embodiment of the present disclosure.

Referring to FIG. 16, which is a block diagram of another apparatus for adjusting automatic retransmission according to an exemplary embodiment, on the basis of the apparatus embodiment shown in FIG. 14, the UE reducing submodule 332 may include: a first resource occupation ratio determining unit 33211, a first comparison unit 33214 and a sharing cancelling unit 33215.

The first resource occupation ratio determining unit 33211 is configured to determine a first resource occupation ratio at which a target retransmission resource is occupied by each of the target UEs, wherein the target retransmission resource includes at least one of the original retransmission alternative resource or an abnormal scheduling resource corresponding to an abnormal retransmission scheduling.

The first comparison unit 33214 is configured to compare the first resource occupation ratio for each target UE with a preset ratio threshold value.

The sharing cancelling unit 33215 is configured to cancel sharing of the original retransmission alternative resource by the current target UE, in response to that the first resource occupation ratio for a current target UE is greater than or equal to the preset ratio threshold value.

Figure 17:
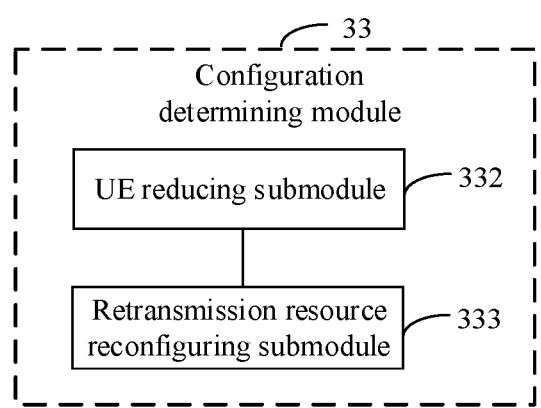
FIG. 17 is a block diagram of another apparatus for adjusting automatic retransmission according to an exemplary embodiment of the present disclosure.

Referring to FIG. 17, a block diagram of another apparatus for adjusting automatic retransmission according to an exemplary embodiment, on the basis of the apparatus embodiment shown in FIG. 14, the configuration determining module 33 may further include a retransmission resource reconfiguring submodule 333.

The retransmission resource reconfiguring submodule 333 is configured to configure a new uplink retransmission alternative resource for the target UEs whose sharing is cancelled.

Figure 18:
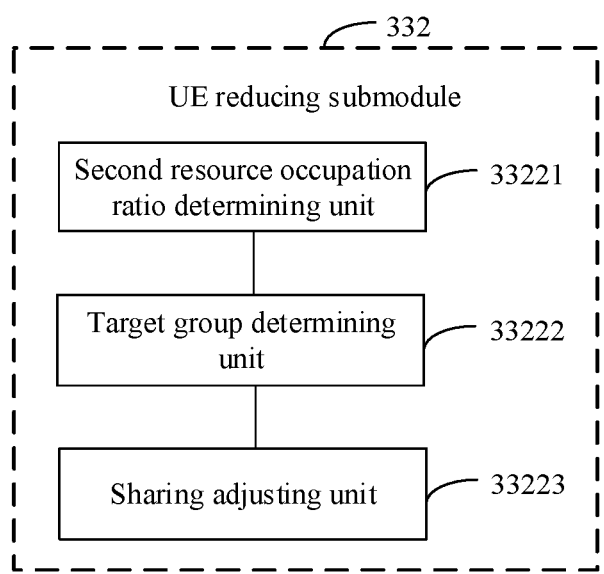
FIG. 18 is a block diagram of another apparatus for adjusting automatic retransmission according to an exemplary embodiment of the present disclosure.

In another apparatus embodiment of the present disclosure, the target UE may include all sharing UEs within different sharing terminal groups;

Referring to FIG. 18, which is a block diagram of another apparatus for adjusting automatic retransmission according to an exemplary embodiment, on the basis of the apparatus embodiment shown in FIG. 14, the UE reducing submodule 332 may include a second resource occupation ratio determining unit 33221, a target group determining unit 33222 and sharing adjusting unit 33223.

The second resource occupation ratio determining unit 33221 is configured to determine a second resource occupation ratio at which a target retransmission resource is occupied by each of the sharing UE groups, wherein the target retransmission resource includes at least one of the original retransmission alternative resource or an abnormal scheduling resource corresponding to an abnormal retransmission scheduling.

The target group determining unit 33222 is configured to sequence the second resource occupation ratios for the sharing UE groups, and determining a preset number of target sharing UE groups starting from a sharing UE group corresponding to a maximum second resource occupation ratio.

The sharing adjusting unit 33223 is configured to adjust sharing of the original retransmission alternative resource by the target sharing UE groups.

Figure 19:
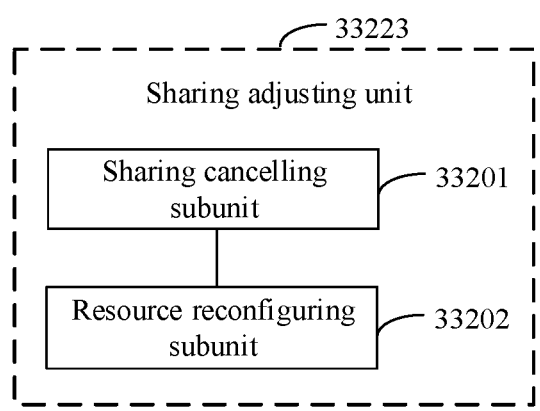
FIG. 19 is a block diagram of another apparatus for adjusting automatic retransmission according to an exemplary embodiment of the present disclosure.

Referring to FIG. 19, which is a block diagram of another apparatus for adjusting automatic retransmission according to an exemplary embodiment, on the basis of the apparatus embodiment shown in FIG. 18, the sharing adjusting unit 33223 may include: a sharing cancelling subunit 33201 and a resource reconfiguring subunit 33202.

The sharing cancelling subunit 33201 is configured to cancel sharing of the original retransmission alternative resource by the target sharing UE groups.

The resource reconfiguring subunit 33202 is configured to configure a new uplink retransmission alternative resource for the target sharing UE groups whose sharing is cancelled.

In another device embodiment of the present disclosure, the sharing adjusting unit 33223 may further include only the sharing cancelling subunit 33201.

Figure 20:
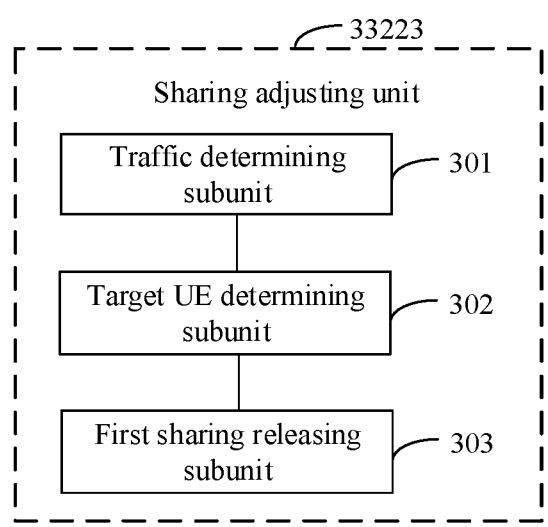
FIG. 20 is a block diagram of another apparatus for adjusting automatic retransmission shown in accordance with an exemplary embodiment of the present disclosure.

Referring to FIG. 20, which is a block diagram of another apparatus for adjusting automatic retransmission according to an exemplary embodiment, on the basis of the apparatus embodiment shown in FIG. 18, the sharing adjusting unit 33223 may include: a traffic determining subunit 301, a target UE determining subunit 302, and first sharing releasing subunit 303.

The traffic determining subunit 301 is configured to determine an uplink retransmission traffic of each of the target UEs in the target sharing UE group.

The target UE determining subunit 302 is configured to sequence the uplink retransmission traffics of the target UEs, and determine a preset number of the target UEs starting from a target UE having a largest uplink retransmission traffic.

The first sharing releasing subunit 303 is configured to release a sharing relationship between the preset number of target UEs and remaining target UEs in the target sharing UE group.

Figure 21:
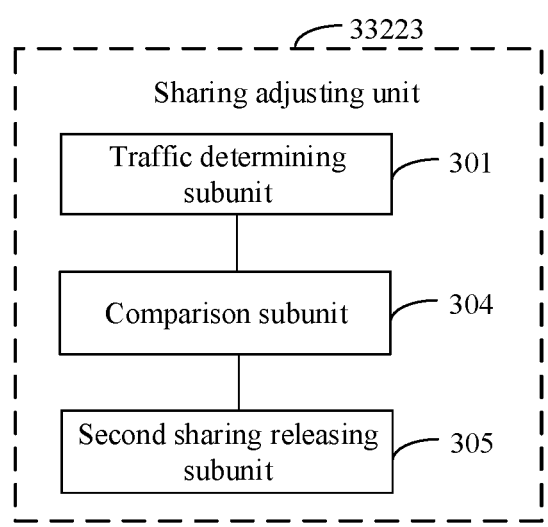
FIG. 21 is a block diagram of another apparatus for adjusting automatic retransmission according to an exemplary embodiment of the present disclosure.

Referring to FIG. 21, which is a block diagram of another apparatus for adjusting automatic retransmission according to an exemplary embodiment, on the basis of the apparatus embodiment shown in FIG. 18, the sharing adjusting unit 33223 may include a traffic determining subunit 301, a comparison subunit 304 and second sharing releasing subunit 305.

The traffic determining subunit 301 is configured to determine an uplink retransmission traffic of each of the target UEs in the target sharing UE group.

The comparison subunit 304 is configured to compare the uplink retransmission traffic of each target UE with a preset traffic threshold value.

The second sharing releasing subunit 305 is configured to release a sharing relationship between the current target UE and the remaining target UEs in the target sharing UE group, in response to that a ratio of the uplink retransmission traffic of the current target UE is greater than or equal to the preset traffic threshold value.

Figure 22:
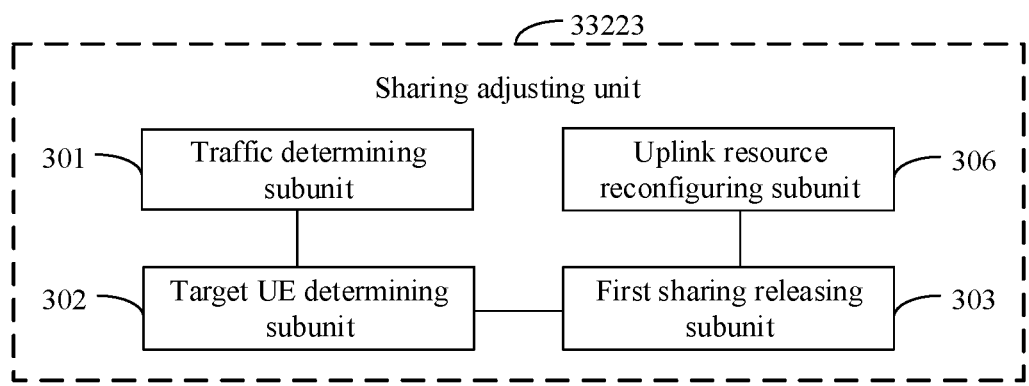
FIG. 22 is a block diagram of another apparatus for adjusting automatic retransmission according to an exemplary embodiment of the present disclosure.

Referring to FIG. 22, which is a block diagram of another apparatus for adjusting automatic retransmission according to an exemplary embodiment, on the basis of the apparatus embodiment shown in FIG. 20, the sharing adjusting unit 33223 may further include a uplink resource reconfiguring subunit 306.

The uplink resource reconfiguring subunit 306 is configured to configure a grant-free periodic uplink transmission resource in the unlicensed spectrum for the target UEs whose sharing relationship is released.

Similarly, in another embodiment of the present disclosure, on the basis of the embodiment shown in FIG. 21, the sharing adjusting unit 33223 may further include uplink resource reconfiguring subunit 306.

In an apparatus embodiment of the present disclosure, if the configuration adjusting module 33 includes the resource enlarging submodule 331, the adjusted retransmission configuration information determined by the configuration adjusting module 33 is used for informing a time-frequency range of an enlarged retransmission alternative resource to each target UE.

Accordingly, the sending module 34 may be configured to send the adjusted retransmission configuration information to each of the target UEs, to enable each of the target UEs to perform uplink automatic retransmission by using the enlarged retransmission alternative resource.

In another apparatus embodiment of the present disclosure, if the configuration adjusting module 33 includes the UE reducing submodule 332, the adjusted retransmission configuration information determined by the configuration adjusting module 33 is at least used for informing the target UEs whose sharing is cancelled to prohibit automatic uplink retransmission by using the original retransmission alternative resource.

Accordingly, the sending module 34 may be configured to send the adjusted retransmission configuration information to the target UEs whose sharing is cancelled.

Accordingly, the present disclosure further provides an apparatus for adjusting automatic retransmission provided in a UE, where the UE shares a same original retransmission alternative resource with other UEs for automatic uplink retransmission.

Figure 23:
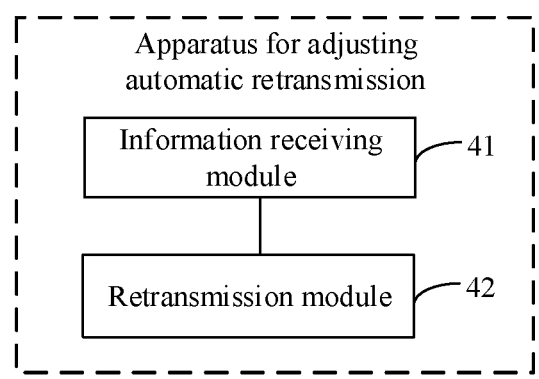
FIG. 23 is a block diagram of an apparatus for adjusting automatic retransmission according to an exemplary embodiment of the present disclosure.

Referring to FIG. 23, a block diagram of an apparatus for adjusting automatic retransmission according to an exemplary embodiment, the apparatus may include a information receiving module 41 and a retransmission module 42.

The information receiving module 41 is configured to receive adjusted retransmission configuration information delivered from a base station, wherein the adjusted retransmission configuration information is used for instructing the UE to adjust a retransmission alternative resource based on the original retransmission alternative resource.

The retransmission module 42 is configured to, after listen before talk (LBT) detection performed on a grant-free uplink transmission resource fails, perform uplink retransmission according to the adjusted retransmission configuration information.

In an embodiment of the present disclosure, the adjusted retransmission configuration information received by the information receiving module 41 is used for instructing the UE to perform automatic uplink retransmission on an adjusted retransmission alternative resource.

Figure 24:
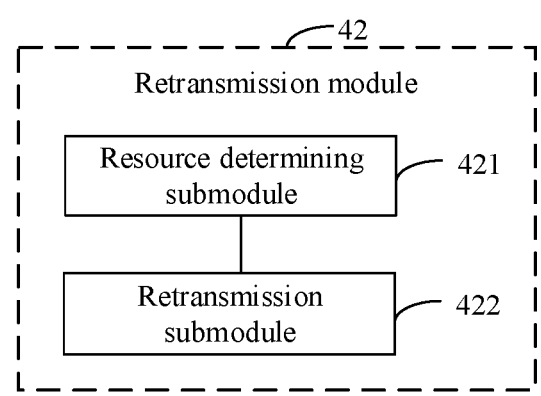
FIG. 24 is a block diagram of another apparatus for adjusting automatic retransmission according to an exemplary embodiment of the present disclosure.

Referring to FIG. 24, which is a block diagram of another apparatus for adjusting automatic retransmission according to an exemplary embodiment, on the basis of the apparatus embodiment shown in FIG. 23, the retransmission module 42 may include a resource determining submodule 421 and a retransmission submodule 422.

The resource determining submodule 421 is configured to determine, based on the original retransmission alternative resource, an enlarged retransmission alternative resource according to the adjusted retransmission configuration information.

The retransmission submodule 422 is configured to perform automatic uplink retransmission by using the enlarged retransmission alternative resource, after the LBT detection performed on the grant-free uplink transmission resource fails.

In another apparatus embodiment of the present disclosure, the adjusted retransmission configuration information received by the information receiving module 41 includes indication information for indicating that the original retransmission alternative resource is prohibited from being used.

The retransmission module 42 may be configured to implement uplink retransmission on a newly acquired retransmission resource according to the indication information for indicating that the original retransmission alternative resource is prohibited from being used.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

Accordingly, according to the one aspect of the present disclosure, there is provided a base station including:
 a processor;
 a memory for storing processor-executable instructions;
 where the processor is configured to:
  detect uplink retransmission service information of at least two target UEs, wherein after LBT detection performed on a grant-free uplink transmission resource in an unlicensed spectrum fails, the at least two target UEs are capable of sharing a same original retransmission alternative resource to perform automatic uplink retransmission;
  determine whether the original retransmission alternative resource is overloaded according to the uplink retransmission service information;
  adjust related configuration information of retransmission alternative resource to obtain adjusted retransmission configuration information, in response to that the original retransmission alternative resource is overloaded;
  deliver the adjusted retransmission configuration information to the target UEs, to enable the target UEs to perform data retransmission according to the adjusted retransmission configuration information.

According to the another aspect of the present disclosure, there is provided a UE, including:
 a processor;
 a memory for storing processor-executable instructions;
 where the processor is configured to:
  receive adjusted retransmission configuration information delivered from abase station, wherein the adjusted retransmission configuration information is used for instructing the terminal to adjust a retransmission alternative resource based on the original retransmission alternative resource;
  after LBT detection performed on a grant-free uplink transmission resource fails, perform, uplink retransmission according to the adjusted retransmission configuration information.

Figure 25:
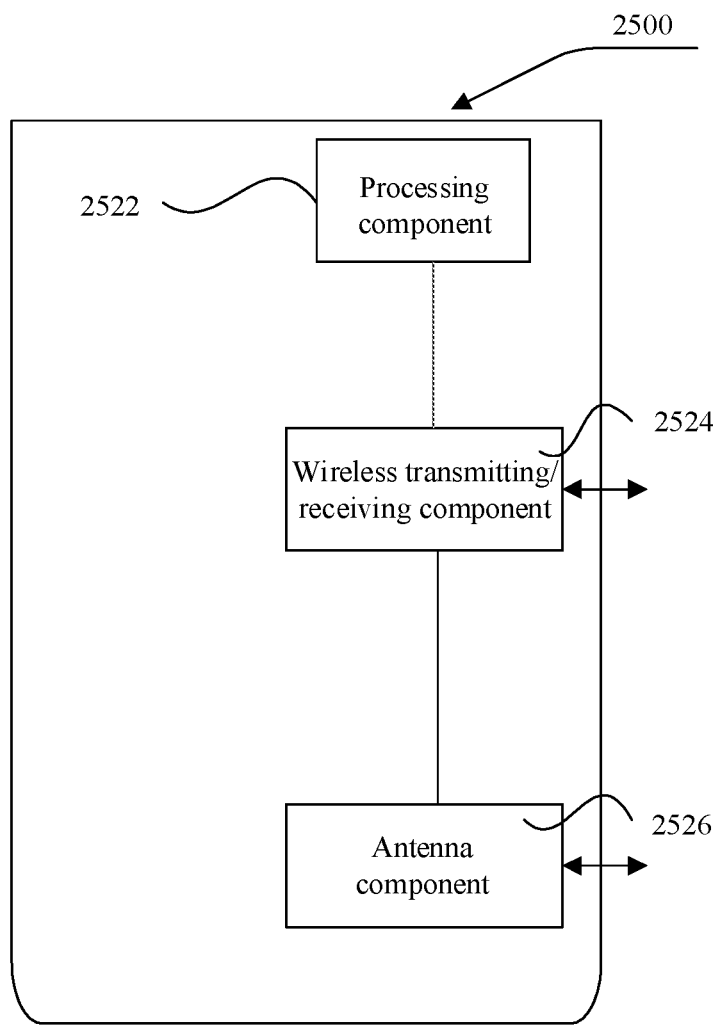
FIG. 25 is a schematic structural diagram of a base station according to an exemplary embodiment of the present disclosure.

As shown in FIG. 25, FIG. 25 is a schematic structural diagram of a base station 2500 according to an exemplary embodiment. Referring to FIG. 25, the base station 2500 includes a processing component 2522, which may further include one or more processors, a wireless transmitting/receiving component 2524, an antenna component 2526, and a signal processing portion specific to the wireless interface. One of the processors in the processing component 2522 may be configured to:
 detect uplink retransmission service information of at least two target UEs, wherein after LBT detection performed on a grant-free uplink transmission resource in an unlicensed spectrum fails, the at least two target UEs are capable of sharing a same original retransmission alternative resource to perform automatic uplink retransmission;
 determine whether the original retransmission alternative resource is overloaded according to the uplink retransmission service information;
 adjust related configuration information of retransmission alternative resource to obtain adjusted retransmission configuration information, in response to that the original retransmission alternative resource is overloaded;
 deliver the adjusted retransmission configuration information to the target UEs, to enable the target UEs to perform data retransmission according to the adjusted retransmission configuration information. In an exemplary embodiment, there is also provided a non-transitory computer-readable storage medium having stored thereon computer instructions that, when executed by a processing component 2522 of a base station 2500, implement the method described in FIG. 1-FIG. 7. For example, the non-transitory computer-readable storage medium may be a Read-Only Memory (ROM), a random access memory (RAM), a CD-ROM, a magnetic tape, a floppy disk, an optical data storage device, and the like.

Figure 26:
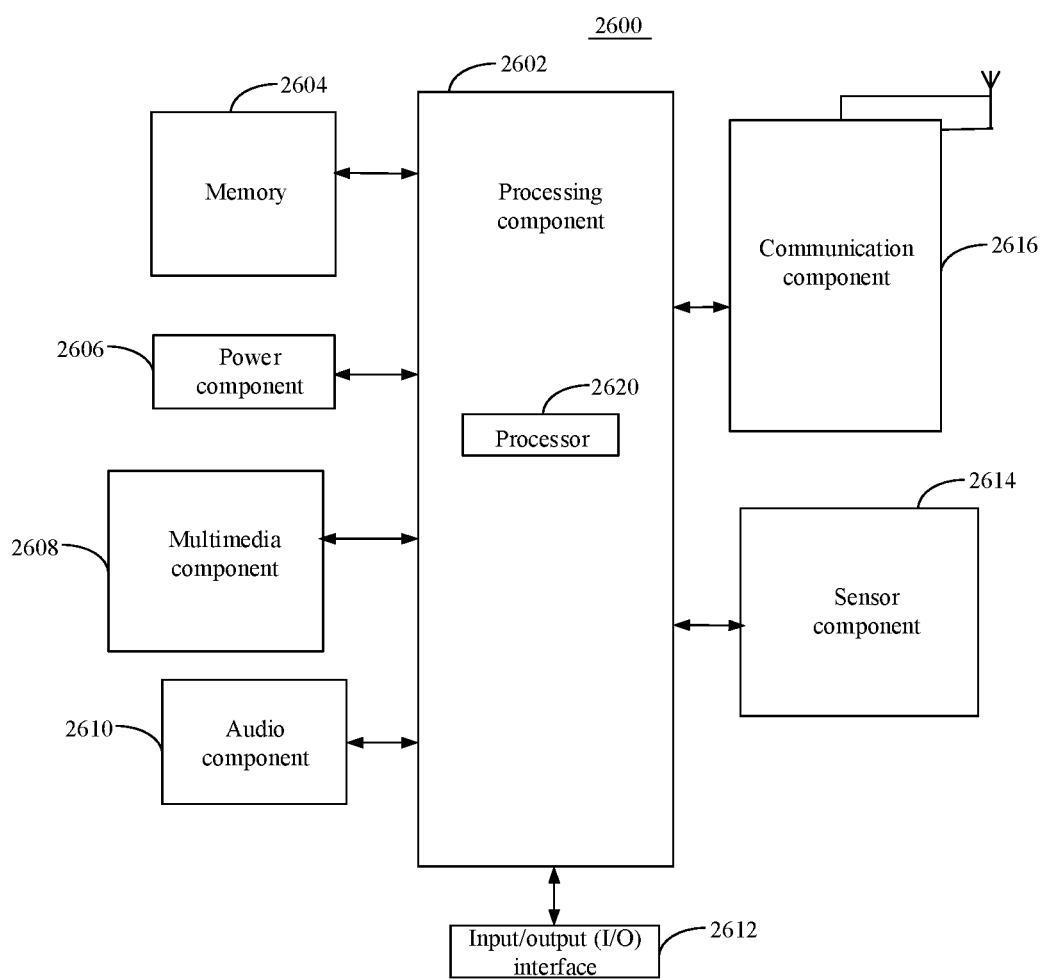
FIG. 26 is a schematic structural diagram of a UE according to an exemplary embodiment of the present disclosure.

FIG. 26 is a schematic structural diagram of a UE 2600 according to an exemplary embodiment. For example, the UE 2600 may be user equipment, and may be specifically a mobile phone, a computer, a digital broadcast terminal, a messaging device, a game console, a tablet device, a medical device, an exercise device, a personal digital assistant, a wearable device such as a smart watch, smart glasses, a smart band, a smart running shoe, and the like.

Referring to FIG. 26, UE 2600 may include one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls overall operations of the UE 2600, such as the operations associated with display, telephone calls, data communications, camera operations, and recording operations. The processing component 2602 may include one or more processors 2620 to execute instructions to perform all or part of the steps in the above described methods. Moreover, the processing component 2602 may include one or more modules which facilitate the interaction between the processing component 2602 and other components. For instance, the processing component 2602 may include a multimedia module 2608 to facilitate the interaction between the multimedia component 2608 and the processing component 2602.

The memory 2604 is configured to store various types of data to support the operation of the UE 2600. Examples of such data include instructions for any applications or methods operated on the device 2600, contact data, phonebook data, messages, pictures, video, etc. The memory 2604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2606 provides power to various components of the UE 2600. The power component 2606 may include a power management system, one or more power sources, and any other components associated with the generation, management, and distribution of power in the UE 2600.

The multimedia component 2608 includes a screen providing an output interface between the UE 2600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2608 includes a front camera and/or a rear camera. The front camera and/or the rear camera may receive an external multimedia datum while the device 2600 is in an operation mode, such as a photographing mode or a video mode. Each of the front camera and the rear camera may be a fixed optical lens system or have focus and optical zoom capability.

The audio component 2610 is configured to output and/or input audio signals. For example, the audio component 2610 includes a microphone ("MIC"), and the MIC is configured to receive an external audio signal when the UE 2600 is in an operation mode, such as a call mode, a recording mode, and a voice recognition mode. The received audio signal may be further stored in the memory 2604 or transmitted via the communication component 2616. In some embodiments, the audio component 2610 further includes a speaker to output audio signals.

The I/O interface 2612 provides an interface between the processing component 2602 and peripheral interface modules, such as a keyboard, a click wheel, buttons, and the like. The buttons may include, but are not limited to, a home button, a volume button, a starting button, and a locking button.

The sensor component 2614 includes one or more sensors to provide status assessments of various aspects of the UE 2600. For instance, the sensor component 2614 may detect an open/closed status of the UE 2600 relative positioning of components, e.g., the display and the keypad, of the UE 2600, the sensor component 2614 may further detect a change in position of the UE 2600 or a component of the UE 2600, a presence or absence of user contact with the UE 2600, an orientation or an acceleration/deceleration of the UE 2600, and a change in temperature of the UE 2600. The sensor component 2614 may include a proximity sensor configured to detect the presence of nearby objects without any physical contact. The sensor component 2614 may also include a light sensor, such as a Complementary Metal Oxide Semiconductor (CMOS) or Charge Coupled Device (CCD) image sensor, configured for use in imaging applications. In some embodiments, the sensor component 2614 may also include an accelerometer sensor, a gyroscope sensor, a magnetic sensor, a pressure sensor, or a temperature sensor.

The communication component 2616 is configured to facilitate communication, wired or wirelessly, between the UE 2600 and other devices. The UE 2600 can access a wireless network based on a communication standard, such as a Wireless Fidelity (WiFi) network, a 2nd-Generation (2G) or 3rd-Generation (3G) network or a combination thereof. In one exemplary embodiment, the communication component 2616 receives a broadcast signal or broadcast associated information from an external broadcast management system via a broadcast channel. In one exemplary embodiment, the communication component 2616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE 2600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2604, executable by the processor 2620 in the UE 2600, for performing the method for adjusting automatic retransmission described above in FIGS. 7 and 8. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The technical solution provided by the embodiments of the present disclosure may include the following advantages.

According to the method for adjusting automatic retransmission provided in the present disclosure, when the base station determines that the original retransmission alternative resource is overloaded, a matching relationship between the retransmission alternative resource and target UEs sharing the retransmission alternative resource can be dynamically adjusted, so that each of the target UEs can successfully implement automatic uplink retransmission by using the above retransmission alternative resource, thereby reducing an uplink retransmission delay of the target UEs and signaling overheads of the retransmission scheduling.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A method for adjusting automatic retransmission, comprising:
    detecting, by a base station, uplink retransmission service information of at least two target user equipments (UEs), wherein after listen before talk (LBT) detection performed on a grant-free uplink transmission resource in an unlicensed spectrum fails, the at least two target UEs are capable of sharing a same original retransmission alternative resource to perform automatic uplink retransmission;
    determining, by the base station, whether the original retransmission alternative resource is overloaded according to the uplink retransmission service information;
    adjusting, by the base station, related configuration information of retransmission alternative resource to obtain adjusted retransmission configuration information in response to determining that the original retransmission alternative resource is overloaded; and
    delivering, by the base station, the adjusted retransmission configuration information to the at least two target UEs,
    wherein detecting the uplink retransmission service information of the at least two target UEs comprises at least one of following acts:
        determining retransmission service load information of the original retransmission alternative resource; or
        determining information about abnormal retransmission scheduling configured by the base station for each of the at least two target UEs, wherein the abnormal retransmission scheduling is a retransmission scheduling event triggered due to a reason that is not a priority of the LBT detection;
    wherein determining whether the original retransmission alternative resource is overloaded according to the uplink retransmission service information comprises:
        determining whether an amount of uplink retransmission data currently carried by the original retransmission alternative resource exceeds a preset load threshold value; and
        determining that the original retransmission alternative resource is overloaded in response to determining that the amount of the uplink retransmission data is greater than or equal to the preset load threshold value.

2. The method of claim 1, wherein determining whether the original retransmission alternative resource is overloaded according to the uplink retransmission service information comprises:
    determining an abnormal retransmission scheduling frequency of each of the at least two target UEs according to the information about the abnormal retransmission scheduling of each target UE, wherein the abnormal retransmission scheduling frequency is a number of times of the abnormal retransmission schedulings performed by the base station for each target UE in a unit time;
    determining whether the abnormal retransmission scheduling frequency is greater than a preset retransmission scheduling threshold value; and
    determining that the original retransmission alternative resource is overloaded in response to determining that the abnormal retransmission scheduling frequency is greater than the preset retransmission scheduling threshold value.

3. The method of claim 1, wherein adjusting the related configuration information of the retransmission alternative resource comprises at least one of following acts:
    enlarging the retransmission alternative resource based on the original retransmission alternative resource; or
    reducing a number of sharing UEs sharing the original retransmission alternative resource.

4. The method of claim 3, wherein reducing the number of the sharing UEs sharing the original retransmission alternative resource comprises:
    determining a first resource occupation ratio at which a target retransmission resource is occupied by each of the at least two target UEs, wherein the target retransmission resource comprises at least one of following resources: the original retransmission alternative resource or an abnormal scheduling resource corresponding to an abnormal retransmission scheduling;
    sequencing the first resource occupation ratios for the at least two target UEs, and determining a preset number of target UEs starting from a target UE corresponding to a maximum first resource occupation ratio; and
    cancelling sharing of the original retransmission alternative resource by the preset number of target UEs to obtain information about updated target UEs.

5. The method of claim 4, wherein adjusting the related configuration information of the retransmission alternative resource further comprises:
    configuring a new uplink retransmission alternative resource for target UEs whose sharing is cancelled.

6. The method of claim 4, wherein the adjusted retransmission configuration information is at least used for informing target UEs whose sharing is cancelled to prohibit automatic uplink retransmission by using the original retransmission alternative resource, and wherein delivering the adjusted retransmission configuration information to the at least two target UEs comprises: sending the adjusted retransmission configuration information to the target UEs whose sharing is cancelled.

7. The method of claim 3, wherein reducing the number of the sharing UEs sharing the original retransmission alternative resource comprises:

determining a first resource occupation ratio at which a target retransmission resource is occupied by each of the at least two target UEs, wherein the target retransmission resource comprises at least one of following resources: the original retransmission alternative resource or an abnormal scheduling resource corresponding to an abnormal retransmission scheduling;

comparing the first resource occupation ratio for each target UE with a preset ratio threshold value; and cancelling sharing of the original retransmission alternative resource by a current target UE in response to determining that the first resource occupation ratio for the current target UE is greater than or equal to the preset ratio threshold value.

8. The method of claim 3, wherein the at least two target UEs comprise all sharing UEs within different sharing UE groups, and wherein reducing the number of sharing UEs sharing the original retransmission alternative resource comprises:

determining a second resource occupation ratio at which a target retransmission resource is occupied by each of the sharing UE groups, wherein the target retransmission resource comprises at least one of following resources: the original retransmission alternative resource or an abnormal scheduling resource corresponding to an abnormal retransmission scheduling;

sequencing second resource occupation ratios for the sharing UE groups, and determining a preset number of target sharing UE groups starting from a sharing UE group corresponding to a maximum second resource occupation ratio; and adjusting sharing of the original retransmission alternative resource by the target sharing UE groups.

9. The method of claim 8, wherein adjusting the sharing of the original retransmission alternative resource by the target sharing UE groups comprises:

cancelling sharing of the original retransmission alternative resource by the target sharing UE groups.

10. The method of claim 9, wherein adjusting the sharing of the original retransmission alternative resource by the target sharing UE groups further comprises:

configuring a new uplink retransmission alternative resource for the target sharing UE groups whose sharing is cancelled.

11. The method of claim 8, wherein adjusting the sharing of the original retransmission alternative resource by the target sharing UE groups comprises:

determining an uplink retransmission traffic of each target UE in the target sharing UE groups;

sequencing the uplink retransmission traffics of the target UEs, and determining a preset number of the target UEs starting from a target UE having a largest uplink retransmission traffic; and releasing a sharing relationship between the preset number of target UEs and remaining target UEs in the target sharing UE groups.

12. The method of claim 11, wherein adjusting the sharing of the original retransmission alternative resource by the target sharing UE groups comprises:

configuring a grant-free periodic uplink transmission resource in the unlicensed spectrum for target UEs whose sharing relationship is released.

13. The method of claim 8, wherein adjusting the sharing of the original retransmission alternative resource by the target sharing UE groups comprises:

determining an uplink retransmission traffic of each target Us in the target sharing UE groups;

comparing the uplink retransmission traffic of each target UE with a preset traffic threshold value; and releasing a sharing relationship between a current target UE and remaining target UEs in the target sharing UE groups in response to determining that the uplink retransmission traffic of the current target UE is greater than or equal to the preset traffic threshold value.

14. The method of claim 3, wherein the adjusted retransmission configuration information is used for informing a time-frequency range of an enlarged retransmission alternative resource to each target UE, and wherein delivering the adjusted retransmission configuration information to the at least two target UEs comprises:

sending the adjusted retransmission configuration information to each target UE to enable the target UE to perform uplink automatic retransmission by using the enlarged retransmission alternative resource.

15. A method for adjusting automatic retransmission, comprising:

receiving, by a user equipment (UE), adjusted retransmission configuration information delivered from a base station, wherein the UE shares a same original retransmission alternative resource with other UEs for automatic uplink retransmission, and the adjusted retransmission configuration information is used for instructing the UE to adjust a retransmission alternative resource based on the original retransmission alternative resource, wherein the adjusted retransmission configuration information is obtained by adjusting related configuration information of the retransmission alternative resource in response to determining that the original retransmission alternative resource is overloaded, wherein determining that the original retransmission alternative resource is overloaded comprises:

determining whether an amount of uplink retransmission data currently carried by the original retransmission alternative resource exceeds a preset load threshold value; and determining that the original retransmission alternative resource is overloaded in response to determining that the amount of the uplink retransmission data is greater than or equal to the preset load threshold value; and performing, by the UE, uplink retransmission according to the adjusted retransmission configuration information, after listen before talk (LBT) detection performed on a grant-free uplink transmission resource fails.

16. The method of claim 15, wherein the adjusted retransmission configuration information is configured to instruct the UE to perform automatic uplink retransmission on an adjusted retransmission alternative resource, and wherein after the LBT detection performed on the grant-free uplink transmission resource fails, performing uplink retransmission according to the adjusted retransmission configuration information comprises:

determining an enlarged retransmission alternative resource based on the original retransmission alternative resource, according to the adjusted retransmission configuration information; and performing automatic uplink retransmission by using the enlarged retransmission alternative resource, after the LBT detection performed on the grant-free uplink transmission resource fails.

17. A base station, comprising:

a processor; and a memory for storing processor-executable instructions, wherein the processor is configured to:

detect uplink retransmission service information of at least two target user equipments (UEs), wherein after listen before talk (LBT) detection performed on a grant-free uplink transmission resource in an unlicensed spectrum fails, the at least two target UEs are capable of sharing a same original retransmission alternative resource to perform automatic uplink retransmission;

determine whether the original retransmission alternative resource is overloaded according to the uplink retransmission service information;

adjust related configuration information of retransmission alternative resource to obtain adjusted retransmission configuration information in response to determining that the original retransmission alternative resource is overloaded; and deliver the adjusted retransmission configuration information to the at least two target UEs, wherein the processor is further configured to perform at least one of following acts:

determining retransmission service load information of the original retransmission alternative resource; or determining information about abnormal retransmission scheduling configured by the base station for each of the at least two target UEs, wherein the abnormal retransmission scheduling is a retransmission scheduling event triggered due to a reason that is not a priority of the LBT detection, wherein the processor is further configured to perform acts comprising:

determining whether an amount of uplink retransmission data currently carried by the original retransmission alternative resource exceeds a preset load threshold value; and determining that the original retransmission alternative resource is overloaded in response to determining that the amount of the uplink retransmission data is greater than or equal to the preset load threshold value.

* * * * *